United States Patent
Liu et al.

(10) Patent No.: US 10,932,133 B2
(45) Date of Patent: Feb. 23, 2021

(54) COMMUNICATION OF SERVICE DATA BASED ON SERVICE AUTHORIZATION INFORMATION

(71) Applicant: Huawei Technologies Co., Ltd., Shenzhen (CN)

(72) Inventors: Qingshun Liu, Shenzhen (CN); Zhenglei Huang, Beijing (CN); Wanqiang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/261,026

(22) Filed: Jan. 29, 2019

(65) Prior Publication Data
US 2019/0159033 A1 May 23, 2019

Related U.S. Application Data

(63) Continuation of application No. PCT/CN2016/092521, filed on Jul. 30, 2016.

(51) Int. Cl.
*H04W 12/08* (2009.01)
*H04W 28/18* (2009.01)
(Continued)

(52) U.S. Cl.
CPC ............. *H04W 12/08* (2013.01); *H04L 12/14* (2013.01); *H04L 12/1407* (2013.01);
(Continued)

(58) Field of Classification Search
CPC ......... H04W 12/08; H04W 4/20; H04W 4/24; H04W 28/18; H04W 88/184;
(Continued)

(56) References Cited

U.S. PATENT DOCUMENTS 8,514,756 B1 * 8/2013 Ramachandra ..... H04L 61/2069
370/310
2013/0227138 A1 8/2013 Cai et al.
(Continued)

FOREIGN PATENT DOCUMENTS

CN 102271367 A 12/2011
CN 102457825 A 5/2012
(Continued)

OTHER PUBLICATIONS

Vodafone, "QoS for solution 2 and RRC establishment 'causes' for NB-IoT", 3GPP TSG SA WG2 Meeting #113, S2-160476, St. Kitts, 1 page (Jan. 25-29, 2016).
(Continued)

*Primary Examiner* — Mounir Moutaouakil
(74) *Attorney, Agent, or Firm* — Leydig, Voit & Mayer, Ltd.

(57) ABSTRACT

A service data transmission method includes: determining, by an access network device, first information of service data to be sent by a terminal, where the first information includes at least one of a service type and a priority; then receiving, by the access network device, the service data sent by the terminal by using a non-access stratum signaling message; and sending, by the access network device, the service data and the first information to a gateway, so that the gateway charges the service data based on the first information after receiving the service data and the first information.

12 Claims, 24 Drawing Sheets

(51) Int. Cl.

| | |
|---|---|
| *H04M 15/00* | (2006.01) |
| *H04L 12/14* | (2006.01) |
| *H04W 4/24* | (2018.01) |
| *H04W 4/20* | (2018.01) |
| *H04W 76/12* | (2018.01) |
| *H04W 4/80* | (2018.01) |
| *H04W 76/27* | (2018.01) |
| *H04W 8/08* | (2009.01) |
| *H04W 72/10* | (2009.01) |
| *H04W 80/10* | (2009.01) |
| *H04W 88/16* | (2009.01) |
| *H04W 88/18* | (2009.01) |
| *H04W 4/70* | (2018.01) |
| *H04W 48/08* | (2009.01) |
| *H04W 76/10* | (2018.01) |

(52) U.S. Cl.
CPC ........... *H04M 15/64* (2013.01); *H04M 15/65* (2013.01); *H04M 15/66* (2013.01); *H04W 4/20* (2013.01); *H04W 4/24* (2013.01); *H04W 4/80* (2018.02); *H04W 8/08* (2013.01); *H04W 28/18* (2013.01); *H04W 72/10* (2013.01); *H04W 76/12* (2018.02); *H04W 76/27* (2018.02); *H04W 80/10* (2013.01); *H04W 88/16* (2013.01); *H04W 88/184* (2013.01); *H04W 4/70* (2018.02); *H04W 48/08* (2013.01); *H04W 76/10* (2018.02)

(58) Field of Classification Search
CPC ..... H04W 88/16; H04W 80/10; H04W 72/10; H04W 8/08; H04W 76/27; H04W 4/80; H04W 76/12; H04W 76/10; H04W 48/08; H04W 4/70; H04W 4/38; H04L 12/14; H04L 12/1407; H04M 15/65; H04M 15/64; H04M 15/66
See application file for complete search history.

(56) References Cited

U.S. PATENT DOCUMENTS

| | | | | |
|---|---|---|---|---|
| 2014/0071878 A1* | 3/2014 | Xu | ........................ | H04L 12/189 370/312 |
| 2014/0226482 A1* | 8/2014 | Lv | ........................... | H04W 4/18 370/235 |
| 2014/0254356 A1* | 9/2014 | Jeong | ....................... | H04L 47/20 370/229 |
| 2015/0016381 A1* | 1/2015 | Kaikkonen | ........... | H04W 48/18 370/329 |
| 2015/0172847 A1 | 6/2015 | Yang et al. | | |
| 2016/0119945 A1* | 4/2016 | Fang | ................. | H04W 28/0278 455/450 |
| 2017/0164286 A1* | 6/2017 | Jeong | ....................... | H04W 8/02 |
| 2017/0303291 A1* | 10/2017 | Chae | ..................... | H04W 72/12 |
| 2018/0070237 A1* | 3/2018 | Cho | ..................... | H04W 12/08 |
| 2019/0014001 A1* | 1/2019 | Tamura | ............... | H04L 41/0806 |

FOREIGN PATENT DOCUMENTS

| | | |
|---|---|---|
| CN | 103391532 A | 11/2013 |
| CN | 103813300 A | 5/2014 |
| WOn | 2014156230 A1 | 10/2014 |

OTHER PUBLICATIONS

Huawei, "Running 36.300 CR to capture agreements on NB-IoT", 3GPP TSG-RAN WG2 Meeting #92 R2-157187, Anaheim, USA, Change Request 36.300, Current version:13.1.0, 18 pages (Nov. 16-20, 2015).

3GPP TR 45.820 V13.1.0 (Nov. 2015); 3rd Generation Partnership Project; Technical Specification Group GSM/EDGE Radio Access Network; Cellular system support for ultra-low complexity and low throughput Internet of Things (CIoT) (Release 13), 495 pages (2015).

"3rd Generation Partnership Project; Technical Specification Group Services and System Aspects; Study on architecture enhancements for Cellular Internet of Things (Release 13)," 3GPP TR 23.720 V13.0.0, XP051086108, pp.1-97, 3rd Generation Partnership Project—Valbonne, France (Mar. 24, 2016).

Swamy, "How LTE Stuff Works?:LTE Attach Accept," XP055670262, pp. 1-5, How Stuff Works Blogs (Nov. 30, 2011).

EP/16910818, Office Action, dated Aug. 17, 2020.

* cited by examiner

COMMUNICATION OF SERVICE DATA BASED ON SERVICE AUTHORIZATION INFORMATION

CROSS-REFERENCE TO RELATED APPLICATIONS

This application is a continuation of International Application No. PCT/CN2016/092521, filed on Jul. 30, 2016, the disclosure of which is hereby incorporated by reference in its entirety.

TECHNICAL FIELD

The present application relates to the field of communications technologies, and in particular, to a service data transmission method and a device.

BACKGROUND

The Internet of things (IoT) is a technology of mounting sensors to various real objects, connecting the sensors by using the Internet, and then running a particular program, to implement remote control of an object or direct communication between objects.

The $3^{rd}$ Generation Partnership Project (3GPP) is conducting a research on a project of Narrowband Internet of Things (NB-IoT), to support an Internet of Things device with ultra-low complexity, limited power, and a low data rate through enhancement of an overall architecture.

An NB-IoT terminal, for example, a water meter, an electricity meter, or a sensor, mainly sends meter reading data or monitoring data whose data volume is very small, for example, generally of dozens to hundreds of bytes, and a sending interval is relatively large. Therefore, to avoid a waste of transmission resources, a small data packet of the NB-IoT terminal is encapsulated in a non-access stratum (NAS) signaling message for transmission.

However, in the manner of transmitting the data of the NB-IoT terminal by using the foregoing NAS signaling message, a network side cannot learn of service data information of the NB-IoT terminal, and therefore cannot provide targeted services for different types of NB-IoT services.

SUMMARY

The present application provides a service data transmission method and a device, to resolve a problem in the prior art that a network side cannot provide targeted services for different types of NB-IoT services.

According to a first aspect, an embodiment of the present application provides a service data transmission method, including:

determining, by an access network device, first information of service data to be sent by a terminal, where the first information includes at least one of a service type and a priority; then receiving, by the access network device, the service data sent by the terminal by using a NAS signaling message; and sending, by the access network device, the service data and the first information to a gateway by using a mobility management entity, so that the gateway charges the service data based on the first information after receiving the service data and the first information. Before the terminal sends the service data by using the NAS signaling message, the access network device determines the first information of the service data to be sent by the terminal; and then the access network device sends the determined first information to the gateway, so that the gateway provides a charging service for the service data of the terminal, to resolve a problem in the prior art that a network side cannot provide targeted services for different types of NB-IoT services due to that the service data is transmitted by using the NAS signaling message.

In a possible design, after the determining, by an access network device, first information of service data to be sent by a terminal and before the receiving, by the access network device, the service data sent by the terminal by using a non-access stratum (NAS) signaling message, the access network device performs transmission resource management on the service data based on the first information. Specifically, the access network device allocates, based on the first information, a transmission resource to transmission of the service data by the terminal, so that the terminal sends the service data to the access network device by using the transmission resource allocated by the access network device.

In a possible design, the determining, by an access network device, first information of service data to be sent by a terminal may be implemented in the following manners:

First Implementation:

The access network device receives the first information sent by the terminal.

Second Implementation:

The access network device receives second information sent by the terminal, where the second information includes the service type and/or the priority that is used by the terminal to request to transmit the service data. The access network device sends the second information to the mobility management entity. The access network device receives first service authorization information sent by the mobility management entity, where the first service authorization information is used to indicate that the service type and/or the priority is allowed to be used by the terminal to transmit the service data. The access network device determines the first information based on the first service authorization information.

In a possible design, the first service authorization information may include indication information, and the indication information is used to indicate that the second information is allowed.

According to a second aspect, an embodiment of the present application provides a service data transmission method, including:

receiving, by a mobility management entity, a non-access stratum (NAS) signaling message, where the NAS signaling message carries service data of a terminal; obtaining, by the mobility management entity, first information of the service data, where the first information includes at least one of a service type of the service data and a priority of the service data; and sending, by the mobility management entity, the service data and the first information to a gateway, so that the gateway charges the service data based on the first information after receiving the service data and the first information. The mobility management entity obtains the first information of the service data after receiving the service data in the NAS signaling message, and sends the first information to the gateway after obtaining the first information, so that the gateway provides a charging service for the service data of the terminal, to resolve a problem in the prior art that a network side cannot provide targeted services for different types of NB-IoT services due to that the service data is transmitted by using the NAS signaling message.

In a possible design, the obtaining, by the mobility management entity, first information of the service data may be implemented in the following manners:

First Possible Implementation:

The mobility management entity receives the first information sent by an access network device.

Second Possible Implementation:

The mobility management entity receives the first information sent by the terminal by using a non-access stratum (NAS) signaling message.

In a possible design, before receiving the first information sent by the access network device, the mobility management entity receives second information sent by the access network device, where the second information includes the service type and/or the priority that is used by the terminal to request to transmit the service data. The mobility management entity authorizes the second information based on subscription information of the terminal to obtain first service authorization information, where the first service authorization information is used to indicate that the service type and/or the priority is used allowed to be used by the terminal to transmit the service data. The mobility management entity sends the first service authorization information to the access network device, so that the access network device determines the first information based on the first service authorization information.

In a possible design, the obtaining, by the mobility management entity, first information of the service data may be implemented in the following manner:

The mobility management entity receives the first information sent by the terminal.

According to a third aspect, an embodiment of the present application provides a service data transmission method, including:

receiving, by a gateway, service data of a terminal and first information of the service data that are sent by a mobility management entity, where the first information includes at least one of a service type and a priority; and charging, by the gateway, the service data based on the first information.

According to a fourth aspect, an embodiment of the present application provides a service data transmission method, including:

receiving, by an access network device, service data sent by a mobility management entity by using a non-access stratum (NAS) signaling message; receiving, by the access network device, information that is about the service data and that is sent by the mobility management entity, where the information about the service data includes at least one of a service type of the service data and a priority of the service data; and performing, by the access network device, transmission resource management on the service data based on the information about the service data. For downlink service data, the mobility management entity sends the service data and the information about the service data to the access network device; and the access network device allocates, based on the information about the service data, a transmission resource to transmission of the service data by the terminal, to resolve a problem in the prior art that a network side cannot provide targeted services for different types of NB-IoT services due to that the service data is transmitted by using the NAS signaling message.

According to a fifth aspect, an embodiment of the present application further provides a service data transmission method, including:

receiving, by mobility management entity, service data of a terminal that is sent by a gateway; obtaining, by the mobility management entity, first information of the service data, where the first information includes at least one of a service type and a priority; sending, by the mobility management entity, a non-access stratum (NAS) signaling message to an access network device, where the NAS signaling message carries the service data; and sending, by the mobility management entity, the first information to the access network device, so that the access network device performs transmission resource management on the service data based on the first information after receiving the first information. After receiving the service data of the terminal, the mobility management entity obtains the first information of the service data, and then sends the service data and the first information of the service data to the access network device, so that the access network device performs transmission resource management on the service data based on the first information, to resolve a problem in the prior art that a network side cannot provide targeted services for different types of NB-IoT services due to that the service data is transmitted by using the NAS signaling message.

In a possible implementation, the obtaining, by the mobility management entity, first information of the service data may be implemented in the following manners:

First Implementation:

The mobility management entity determines the first information based on subscription information of the terminal.

Second Implementation:

The mobility management entity obtains the first information from a header of a data packet of the service data, where the header of the data packet of the service data carries the first information.

According to a sixth aspect, an embodiment of the present application provides a service data transmission method, including:

receiving, by a mobility management entity, a request message, where the request message includes transmission mode indication information, and the transmission mode indication information is used to instruct a terminal to transmit service data by using a non-access stratum (NAS) signaling message; determining, by the mobility management entity, second service authorization information of the terminal based on subscription information of the terminal if the mobility management entity determines, based on the request message, that the terminal transmits the service data by using the non-access stratum (NAS) signaling message, where the second service authorization information includes information used to indicate that a service type and/or a priority that is used by the terminal to transmit the service data is allowed; and sending, by the mobility management entity, the second service authorization information to the terminal.

According to an embodiment of the present invention, when determining that the terminal transmits the service data by using the NAS signaling message, the mobility management entity sends the second service authorization information of the terminal to the terminal, so that the terminal determines information about the sent service data based on the second service authorization information, and notifies an access network device of the information about the service data; and the access network device provides a service for transmission of the service data based on the information about the service data, to resolve a problem in the prior art that a network side cannot provide targeted services for different types of NB-IoT services due to that the service data is transmitted by using the NAS signaling message.

In a possible design, the second service authorization information further includes first quota information, and the first quota information is used to indicate a volume of service data that is of the service type and that is allowed to be sent within a particular time.

In a possible design, the second service authorization information further includes second quota information, and the second quota information is used to indicate a volume of service data that is of the priority and that is allowed to be sent within a particular time.

According to a seventh aspect, an embodiment of the present application provides a service data transmission method, including:

sending, by a terminal, a request message to a mobility management entity, where the request message includes transmission mode indication information, and the transmission mode indication information is used to instruct the terminal to transmit service data by using a non-access stratum (NAS) signaling message; receiving, by the terminal, second service authorization information sent by the mobility management entity, where the second service authorization information includes information used to indicate that a service type and/or a priority that is used by the terminal to transmit the service data is allowed; determining, by the terminal, information about the service data based on the second service authorization information, where the information about the service data includes at least one of the service type of the service data and the priority of the service data; and sending, by the terminal, the information about the service data to the access network device.

According to an embodiment of the present invention, when determining that the terminal transmits the service data by using the NAS signaling message, the mobility management entity sends the second service authorization information of the terminal to the terminal, so that the terminal determines the information about the sent service data based on the second service authorization information, and notifies the access network device of the information about the service data; and the access network device provides a service for transmission of the service data based on the information about the service data, to resolve a problem in the prior art that a network side cannot provide targeted services for different types of NB-IoT services due to that the service data is transmitted by using the NAS signaling message.

In a possible design, the second service authorization information further includes first quota information, and the first quota information is used to indicate a volume of service data that is of the service type and that is allowed to be sent within a particular time.

In a possible design, the second service authorization information further includes second quota information, and the second quota information is used to indicate a volume of service data that is of the priority and that is allowed to be sent within a particular time.

According to an eighth aspect, an embodiment of the present application provides an access network device, including:

a processor, configured to determine first information of service data to be sent by a terminal, where the first information includes at least one of a service type and a priority;

a receiver, configured to receive the service data sent by the terminal by using a non-access stratum (NAS) signaling message; and a communications interface, configured to send the service data received by the receiver and the first information determined by the processor to a gateway by using a mobility management entity, so that the gateway charges the service data based on the first information.

In a possible design, after the processor determines the first information of the service data to be sent by the terminal and before the receiver receives the service data sent by the terminal by using the non-access stratum (NAS) signaling message, the processor is further configured to perform transmission resource management on the service data based on the first information.

In a possible design, the receiver is further configured to receive the first information sent by the terminal.

In a possible design, the receiver is further configured to receive second information sent by the terminal, where the second information includes the service type and/or the priority that is used by the terminal to request to transmit the service data.

The communications interface is further configured to send the second information to the mobility management entity.

The communications interface is further configured to receive first service authorization information sent by the mobility management entity, where the first service authorization information is used to indicate that the service type and/or the priority is allowed to be used by the terminal to transmit the service data The processor is specifically configured to determine the first information based on the first service authorization information.

In a possible design, the first service authorization information includes indication information, and the indication information is used to indicate that the second information is allowed.

According to a ninth aspect, an embodiment of the present application provides a mobility management entity, including:

a communications interface, configured to receive a non-access stratum (NAS) signaling message, where the NAS signaling message carries service data of a terminal; and a processor, configured to obtain first information of the service data received by the communications interface, where the first information includes at least one of a service type of the service data and a priority of the service data.

The communications interface is further configured to send the service data and the first information to a gateway, so that the gateway charges the service data.

In a possible design, the communications interface is further configured to receive the first information sent by an access network device.

Alternatively, the communications interface is further configured to receive the first information sent by the terminal by using a non-access stratum (NAS) signaling message.

In a possible design, before receiving the first information sent by the access network device, the communications interface is further configured to receive second information sent by the access network device, where the second information includes the service type and/or the priority that is used by the terminal to request to transmit the service data.

The processor is further configured to authorize the second information based on subscription information of the terminal to obtain first service authorization information, where the first service authorization information is used to indicate that the service type and/or the priority is allowed to be used by the terminal to transmit the service data.

The communications interface is further configured to send the first service authorization information to the access network device, so that the access network device determines the first information based on the first service authorization information.

In a possible design, the receiver is further configured to receive the first information sent by the terminal.

According to a tenth aspect, an embodiment of the present application provides a gateway, including:

a communications interface, configured to receive service data of a terminal and first information of the service data that are sent by a mobility management entity, where the first information includes at least one of a service type and a priority; and a processor, configured to charge the service data based on the first information received by the communications interface.

According to an eleventh aspect, an embodiment of the present application provides an access network device, including:

a communications interface, configured to receive service data sent by a mobility management entity by using a non-access stratum (NAS) signaling message, and receive information that is about the service data and that is sent by the mobility management entity, where the information about the service data includes at least one of a service type and a priority; and a processor, configured to perform transmission resource management on the service data based on the information about the service data.

According to a twelfth aspect, an embodiment of the present application provides a mobility management entity, including:

a communications interface, configured to receive service data of a terminal that is sent by a gateway; and a processor, configured to obtain first information of the service data received by the communications interface, where the first information includes at least one of a service type and a priority.

The communications interface is configured to send a non-access stratum (NAS) signaling message to an access network device, where the NAS signaling message carries the service data; and send the first information to the access network device, so that the access network device performs transmission resource management on the service data based on the first information.

In a possible design, the processor is specifically configured to determine the first information based on subscription information of the terminal.

Alternatively, the processor is specifically configured to obtain the first information from a header of a data packet of the service data, where the header of the data packet of the service data carries the first information.

According to a thirteenth aspect, an embodiment of the present application provides a mobility management entity, including:

a communications interface, configured to receive a request message, where the request message includes transmission mode indication information, and the transmission mode indication information is used to instruct a terminal to transmit service data by using a non-access stratum (NAS) signaling message; and a processor, configured to determine second service authorization information of the terminal based on subscription information of the terminal when determining, based on the request message, that the terminal transmits the service data by using the non-access stratum (NAS) signaling message, where the second service authorization information includes information used to indicate that a service type and/or a priority that is used by the terminal to transmit the service data is allowed.

The communications interface is further configured to send the second service authorization information to the terminal.

In a possible design, the second service authorization information further includes first quota information, and the first quota information is used to indicate a volume of service data that is of the service type and that is allowed to be sent within a particular time.

In a possible design, the second service authorization information further includes second quota information, and the second quota information is used to indicate a volume of service data that is of the priority and that is allowed to be sent within a particular time.

According to a fourteenth aspect, an embodiment of the present application provides a terminal, including:

a transmitter, configured to send a request message to a mobility management entity, where the request message includes transmission mode indication information, and the transmission mode indication information is used to instruct the terminal to transmit service data by using a non-access stratum (NAS) signaling message;

a receiver, configured to receive second service authorization information sent by the mobility management entity, where the second service authorization information includes information used to indicate that a service type and/or a priority that is used by the terminal to transmit the service data is allowed; and a processor, configured to determine information about the service data based on the second service authorization information, where the information about the service data includes at least one of the service type of the service data and the priority of the service data The transmitter is further configured to send the information that is about the service data and that is determined by the processor to the access network device.

In a possible design, the second service authorization information further includes first quota information, and the first quota information is used to indicate a volume of service data that is of the service type and that is allowed to be sent within a particular time.

In a possible design, the second service authorization information further includes second quota information, and the second quota information is used to indicate a volume of service data that is of the priority and that is allowed to be sent within a particular time.

According to a fifteenth aspect, an embodiment of the present application provides an access network device, including:

a determining unit, configured to determine first information of service data to be sent by a terminal, where the first information includes at least one of a service type and a priority;

a receiving unit, configured to receive the service data sent by the terminal by using a non-access stratum (NAS) signaling message; and a sending unit, configured to send the service data received by the receiving unit and the first information determined by the determining unit to a gateway by using a mobility management entity, so that the gateway charges the service data based on the first information.

In a possible design, the access network device further includes a management unit, configured to perform transmission resource management on the service data based on the first information after the determining unit determines the first information of the service data to be sent by the terminal and before the receiving unit receives the service data sent by the terminal by using the non-access stratum (NAS) signaling message.

In a possible design, the determining unit is specifically configured to determine the first information when the receiving unit receives the first information sent by the terminal.

In a possible design, the receiving unit is further configured to receive second information sent by the terminal, where the second information includes the service type and/or the priority that is used by the terminal to request to transmit the service data.

The sending unit is further configured to send the second information to the mobility management entity.

The receiving unit is further configured to receive first service authorization information sent by the mobility management entity, where the first service authorization information is used to indicate that the service type and/or the priority is allowed to be used by the terminal to transmit the service data.

The determining unit is specifically configured to determine the first information based on the first service authorization information.

In a possible design, the first service authorization information includes indication information, and the indication information is used to indicate that the second information is allowed.

According to a sixteenth aspect, an embodiment of the present application provides a mobility management entity, including:

a receiving unit, configured to receive a non-access stratum (NAS) signaling message, where the NAS signaling message carries service data of a terminal;

an obtaining unit, configured to obtain first information of the service data received by the receiving unit, where the first information includes at least one of a service type of the service data and a priority of the service data; and a sending unit, configured to send the service data and the first information to a gateway, so that the gateway charges the service data.

In a possible design, the obtaining unit is specifically configured to obtain the first information when the receiving unit receives the first information sent by an access network device.

Alternatively, the obtaining unit is specifically configured to obtain the first information when the receiving unit receives the first information sent by the terminal by using a NAS signaling message.

In a possible design, before receiving the first information sent by the access network device, the receiving unit is further configured to receive second information sent by the access network device, where the second information includes the service type and/or the priority that is used by the terminal to request to transmit the service data.

The mobility management entity further includes an authorization unit, configured to authorize the second information based on subscription information of the terminal to obtain first service authorization information, where the first service authorization information is used to indicate that the service type and/or the priority is allowed to be used by the terminal to transmit the service data.

The sending unit is further configured to send the first service authorization information to the access network device, so that the access network device determines the first information based on the first service authorization information.

In a possible design, the obtaining unit is specifically configured to obtain the first information when the receiving unit receives the first information sent by the terminal.

According to a seventeenth aspect, an embodiment of the present application provides a gateway, including:

a receiving unit, configured to receive service data of a terminal and first information of the service data that are sent by a mobility management entity, where the first information includes at least one of a service type and a priority; and a charging unit, configured to charge the service data based on the first information.

According to an eighteenth aspect, an embodiment of the present application further provides an access network device, including:

a receiving unit, configured to receive service data sent by a mobility management entity by using a non-access stratum (NAS) signaling message, and receive information that is about the service data and that is sent by the mobility management entity, where the information about the service data includes at least one of a service type of the service data and a priority of the service data; and a management unit, configured to perform transmission resource management on the service data based on the information that is about the service data and that is received by the receiving unit.

According to a nineteenth aspect, an embodiment of the present application provides a mobility management entity, including:

a receiving unit, configured to receive service data of a terminal that is sent by a gateway;

an obtaining unit, configured to obtain first information of the service data received by the receiving unit, where the first information includes at least one of a service type of the service data and a priority of the service data; and a sending unit, configured to send a non-access stratum (NAS) signaling message to an access network device, where the NAS signaling message carries the service data obtained by the obtaining unit; and send the first information to the access network device, so that the access network device performs transmission resource management on the service data based on the first information.

In a possible design, the obtaining unit is specifically configured to determine the first information based on subscription information of the terminal.

Alternatively, the obtaining unit obtains the first information from a header of a data packet of the service data, where the header of the data packet of the service data carries the first information.

According to a twentieth aspect, an embodiment of the present application provides a mobility management entity, including:

a receiving unit, configured to receive a request message, where the request message includes transmission mode indication information, and the transmission mode indication information is used to instruct a terminal to transmit service data by using a non-access stratum (NAS) signaling message;

a determining unit, configured to determine second service authorization information of the terminal based on subscription information of the terminal when determining, based on the request message, that the terminal transmits the service data by using the non-access stratum (NAS) signaling message, where the second service authorization information includes information used to indicate a service type and/or a priority that is allowed to be used by the terminal to transmit the service data; and a sending unit, configured to send the second service authorization information determined by the determining unit to the terminal.

In a possible design, the second service authorization information further includes first quota information, and the first quota information is used to indicate a volume of service data that is of the service type and that is allowed to be sent within a particular time.

In a possible design, the second service authorization information further includes second quota information, and the second quota information is used to indicate a volume of service data that is of the priority and that is allowed to be sent within a particular time.

According to a twenty-first aspect, an embodiment of the present application provides a terminal, including:

a sending unit, configured to send a request message to a mobility management entity, where the request message includes transmission mode indication information, and the transmission mode indication information is used to instruct the terminal to transmit service data by using a non-access stratum (NAS) signaling message;

a receiving unit, configured to receive second service authorization information sent by the mobility management entity, where the second service authorization information includes information used to indicate that a service type and/or a priority that is used by the terminal to transmit the service data is allowed; and a determining unit, configured to determine information about the service data based on the second service authorization information received by the receiving unit, where the information about the service data includes at least one of the service type of the service data and the priority of the service data.

The sending unit is further configured to send the information that is about the service data and that is determined by the determining unit to the access network device.

In a possible design, the second service authorization information further includes first quota information, and the first quota information is used to indicate a volume of service data that is of the service type and that is allowed to be sent within a particular time.

In a possible design, the second service authorization information further includes second quota information, and the second quota information is used to indicate a volume of service data that is of the priority and that is allowed to be sent within a particular time.

DESCRIPTION OF EMBODIMENTS

To make objectives, technical solutions, and advantages of the present application clearer, the following further describes exemplary embodiments of the present application in detail with reference to the accompanying drawings. The described embodiments are merely some rather than all embodiments of the present invention. Other embodiments obtained by persons of ordinary skill in the art based on the described embodiments of the present application without creative efforts may fall within the protection scope of the present invention.

The present application provides a service data transmission method and a device, to resolve a problem in the prior art that a network side cannot provide targeted services for different types of NB-IoT services. The method and the device are based on a same inventive concept. Because problem-resolving principles for the method and the device are similar, implementations of the device and the method can be referenced to each other. No repeated description is provided. "And/or" used in embodiments of the present application may be an "and" relationship or an "or" relationship. For example, A and/or B may represent that only A exists, only B exists, or both A and B exist.

It should be understood that in embodiments of the present invention, a terminal may be referred to as user equipment (UE), a mobile station (MS), a mobile terminal, and the like. The terminal may communicate with one or more core network devices through a radio access network (RAN). For example, the terminal may be a mobile phone (or referred to as a "cellular" phone) or a computer having a mobile terminal. For example, the terminal may alternatively be a portable, pocket-sized, handheld, computer built-in, or in-vehicle mobile device, which exchanges voice and/or data with the radio access network.

It should further be understood that technical solutions provided in embodiments of the present application may be applied to various communications systems, for example, a Global system for mobile communications (GSM), a Code Division Multiple Access (CDMA) system, a Wideband Code Division Multiple Access (WCDMA) system, a general packet radio service (GPRS) system, a Long Term Evolution (LTE) system, and an evolved packet system (EPS).

Figure 1:
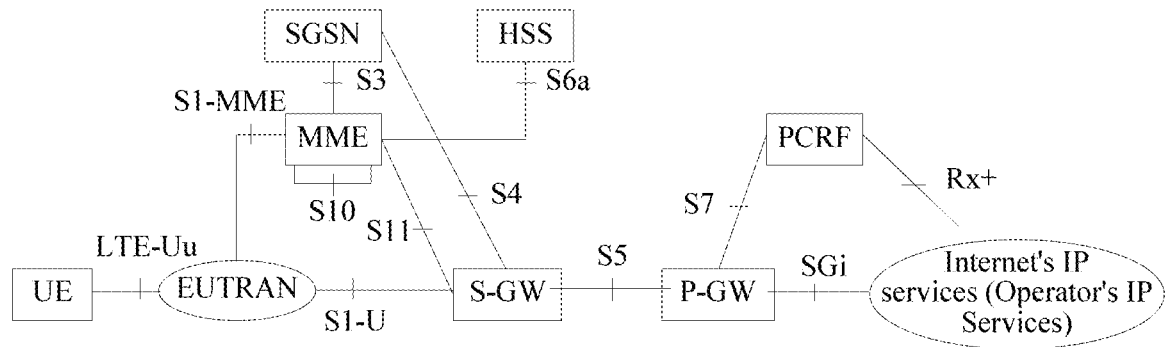
FIG. 1 is an architectural diagram of an EPS network system according to an embodiment of the present invention.

An example in which technical solutions are applied to the EPS system is used for description in embodiments of the present invention. FIG. 1 is an architectural diagram of an EPS network system. The EPS network system includes: UE, an evolved universal terrestrial radio access network (EUTRAN), a mobility management entity (MME), a serving gateway (S-GW), a packet data network gateway (P-GW), a serving GPRS support node (SGSN), a home subscriber server (HSS), a policy and charging rules function (PCRF), and operator's Internet Protocol (IP) services.

The EUTRAN is a network including a plurality of evolved NodeB (eNB), and can implement a wireless physical layer function and functions of resource scheduling, radio resource management, radio access control, and mobility management. The eNB is connected to the serving gateway (S-GW) by using a user plane interface S1-U and configured to transmit user data, is connected to the MME by using a control plane interface S1-MME, and implements functions such as radio access bearer control by using an S1-AP protocol.

The MME is mainly responsible for all control plane functions that are of user management and session management and that include NAS signaling and security, tracking area management, selection of the P-GW and the S-GW, and the like.

The S-GW is mainly responsible for data transmission and forwarding, route switching, and the like of the UE, and is used as a local mobility anchor point during switching of the UE between eNBs. For each UE, only one S-GW serves the UE at each time point.

The P-GW is used as an anchor point of a connection to a packet data network (PDN), and is responsible for IP address allocation of the UE, data packet filter of the UE, rate control, charging information generation, and the like.

The HSS is a database used to store user subscription information, and main functions of the device are storage of the user subscription information, user authentication, location information management, and the like.

The PCRF is used for QoS control, gating, charging control, and the like based on a service data flow.

The SGSN mainly completes functions such as route forwarding of a data packet, mobility management, session management, logical link management, authentication and encryption, and bill generation and output.

Service types of service data in the NB-IoT are shown in Table 1.

TABLE 1

| Service type | Service feature | Remarks |
| --- | --- | --- |
| Exception report | A sensor reports an exception when detecting an event. An event rarely happens. Specifically, an event happens once several months or several years. For example, an event is about smoke alert detection or power supply failure notification of an intelligent meter. A size of an application-layer data packet is 20 bytes. Quasi real time is required. For example, a delay of the exception report is less than 10 s, and an application layer acknowledges each exception report. | |
| Periodic report | A size of an application-layer packet is 20-200 bytes. A report period is one day (40%), two hours (40%), one hour (15%), or 30 minutes (5%). The application layer acknowledges 50% of reports, and the periodic report and an acknowledgement are not required to be retransmitted. | Intelligent meter reading, intelligent agriculture, intelligent environment, and the like |
| Network command | An application server sends an application-layer command to a terminal to perform an action. It is assumed that application-layer payload of a downlink command is 20 bytes. A command period is the same as the period of the periodic report. For 50% of commands, uplink responses are sent; the uplink responses do not need to be conformed; a feature of an uplink response report is the same as that of the periodic report. | Request for reporting of intelligent meter reading and remote turning on/off of a light |
| Software upgrading/ reconfiguration | A period of the software upgrading/reconfiguration is 180 days. Application-layer payload is 200-2000 bytes. | |

Analysis of a quality of service requirement of an NB-IoT service is analyzed as follows:

Uplink Part:

(1) A priority of the exception report is higher than a priority of the periodic report, the exception report is required to be preferentially scheduled and transmitted to achieve quasi real time, and a delay is less than 10 s. The periodic report is insensitive to the delay and sending may be delayed.

(2) Some terminals send periodic reports or exception reports. A network side cannot determine a type of a data report sent by a terminal based on the terminal, and only the terminal learns of the type of the data report sent by the terminal. Therefore, the network side cannot provide a service for the terminal, and the terminal notifies the network side in the present invention.

(3) Some terminals (for example, an intelligent water meter and an intelligent meter) send exception reports at lower frequency, while some terminals send exception reports at higher frequency (for example, for intelligent stop and pump control). A solution provided in embodiments of the present application can control use of the exception report.

Downlink Part:

(4) For a downlink, a service priority needs to be distinguished, and a control command having a higher priority is preferentially scheduled and transmitted.

(5) Some users may have both a high-priority control command and a low-priority service, for example, parameter configuration or software upgrading, and some users have only a low-priority service, for example, parameter configuration or software upgrading. Therefore, priorities of different service data sent by different users need to be distinguished.

(6) Frequency of parameter configuration and software upgrading is very low. Therefore, in embodiments of the present invention, a service priority may be distinguished based on a user type. A service of a high-priority user is a high-priority service, and a service of a low-priority user is a low-priority service.

First information in embodiments of the present application includes at least one of a priority of service data of a terminal and a service type of the service data. Second information includes a service type and/or a priority that is used by the terminal to request to transmit the service data.

Embodiment 1

Figure 2:
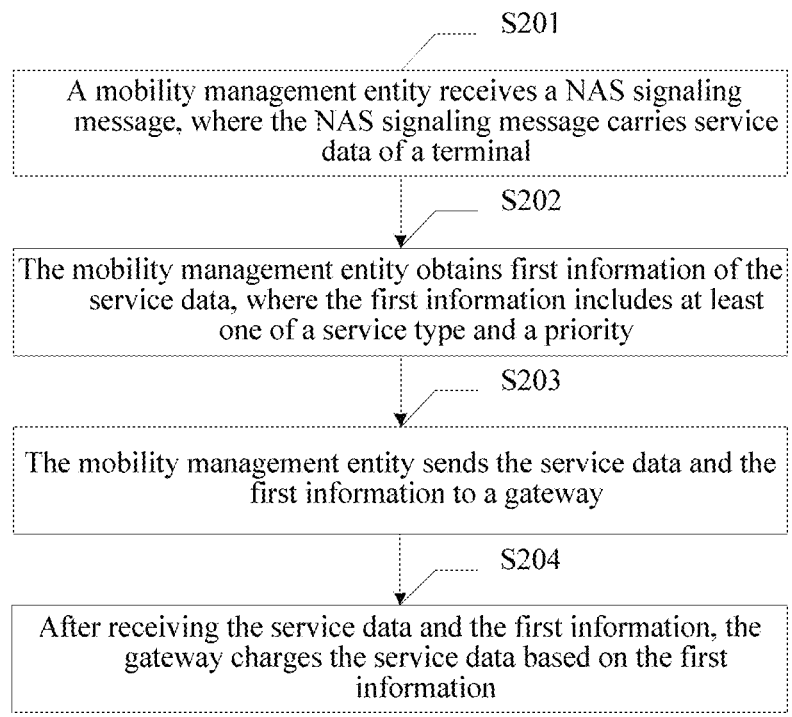
FIG. 2 is a flowchart of a service data transmission method according to Embodiment 1 of the present invention.

Based on the analysis of the quality of service requirement of the NB-IoT service, this embodiment of the present application provides a service data transmission method. A mobility management entity receives service data of a terminal by using a NAS signaling message, obtains first information of the service data, and then sends the service data and the first information to a gateway, so that the gateway can provide a charging service for the service data based on the first information, to control use of a high-priority report of the terminal. As shown in FIG. 2, the method includes the following steps.

S201: The mobility management entity receives the NAS signaling message, where the NAS signaling message carries the service data of the terminal.

S202: The mobility management entity obtains the first information of the service data, where the first information includes at least one of a service type and a priority.

It should be noted that the service type may be a periodic report or an exception report, and the priority may be a first priority or a second priority. The first priority is higher than the second priority.

S203: The mobility management entity sends the service data and the first information to the gateway.

S204: After receiving the service data and the first information, the gateway charges the service data based on the first information.

It should be noted that an access network device may be an eNB, the mobility management entity may be an MME, and the gateway may be an S-GW or a P-GW. This is not limited herein.

It should be noted that the gateway, the access network device, and the mobility management entity in embodiments of the present application may be individual physical devices, may be software functional entities, or may be devices having equivalent functions. This is not limited herein.

The mobility management entity receives the service data of the terminal by using the NAS signaling message, obtains the first information of the service, and then sends the service data and the first information to the gateway, so that the gateway can provide the charging service for the service data based on the first information. Charging control is performed on service data of different service types or priorities, to control the terminal to configure the first information of the service data based on a requirement when sending the service data, thereby preventing a low-priority terminal, for example, a terminal (an intelligent water meter) centering on the periodic report, from overusing a high-priority report (the exception report), and reducing data transmission congestion due to that most terminals all send service data by using a high priority or the exception report.

In this embodiment of the present application, it may be configured that charging is performed based on traffic of the service data, a quantity of data packets of the service data, or a quantity of times of sending service data that is of a high priority or whose service type is the exception report. Specifically, different charging standards may be set based on priorities, and charge of service data of a high priority is higher than that of service data of a low priority. For example, when service data whose traffic is 10 M is sent, if the service data is sent at a high priority, RMB 1 is paid; or if the service data is sent at a low priority, RMB 0.1 is paid. Alternatively, different charging standards may be set based on service types, and charge of service data whose service type is the exception report is high than charge of service data whose service type is the periodic report. For example, when service data is sent once, if the service data is sent by using the periodic report, RMB 0.1 is paid; or if the service data is sent by using the exception report, RMB 0.5 is paid.

In step S201, the NAS signaling message received by the mobility management entity may be specifically sent by the access network device or by the terminal.

In step S202, the first information obtained by the mobility management entity may be sent by the access network device or by the terminal.

Therefore, in a first application scenario of Embodiment 1, the mobility management entity receives the NAS signaling message and the first information of the service data that are sent by the access network device. In a second application scenario of Embodiment 1, the mobility management entity receives the NAS signaling message and the first information of the service data that are sent by the terminal.

Figure 3:
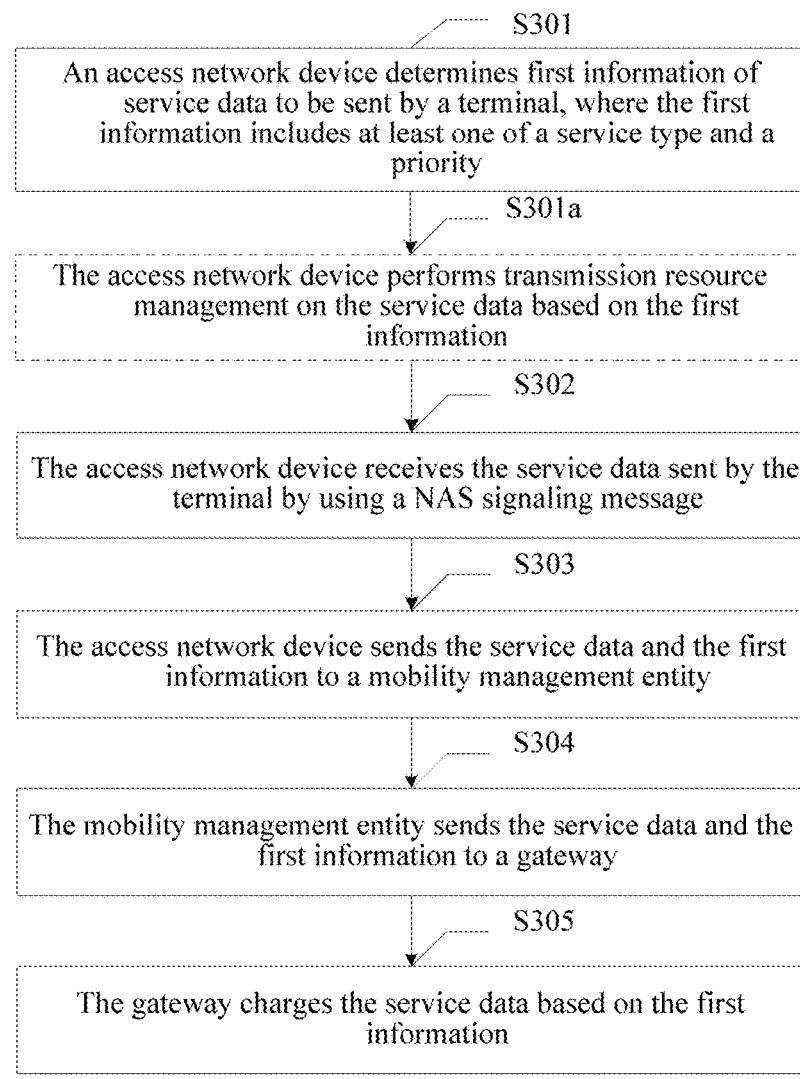
FIG. 3 is a flowchart of another service data transmission method according to Embodiment 1 of the present invention.

The first implementation scenario of Embodiment 1 is described below, that is, the mobility management entity receives the NAS signaling message and the first information of the service data that are sent by the access network device, and the NAS signaling message carries the service data of the terminal. Refer to FIG. 3.

S301: The access network device determines the first information of the service data to be sent by the terminal, where the first information includes at least one of the service type and the priority.

S302: The access network device receives the service data sent by the terminal by using the NAS signaling message.

S303: The access network device sends the service data and the first information to the mobility management entity.

S304: The mobility management entity sends the service data and the first information to the gateway.

S305: The gateway charges the service data based on the first information.

Optionally, after step S301 and before step S302, that is, after the access network device receives the first information sent by the terminal, the method further includes the following step:

S301a: The access network device performs transmission resource management on the service data based on the first information.

Specifically, the performing transmission resource management on the service data based on the first information may be allocating a transmission resource, in other words, a network resource, to the to-be-sent service data based on the first information. For example, the service type of the service data to be transmitted by the terminal is an exception report, and the exception report has a requirement on a transmission delay. Therefore, the network resource allocated by the access network device to the service data needs to satisfy the delay requirement of the exception report. Further, the terminal sends the NAS signaling message carrying the service data to the access network device on the network resource allocated in step S301a.

Figure 4:
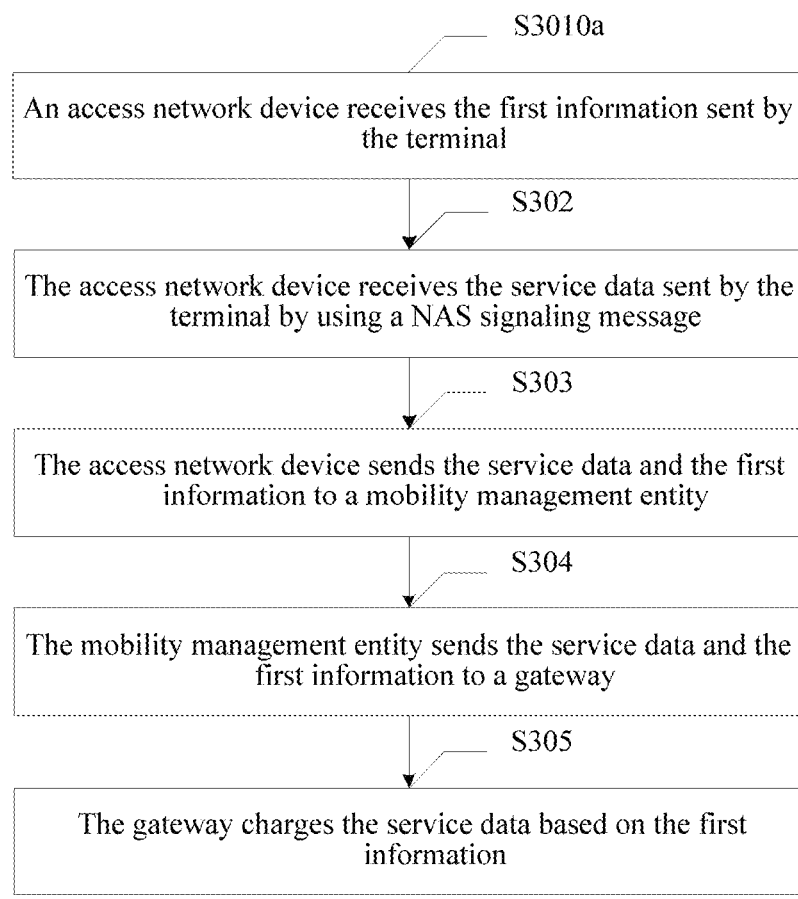
FIG. 4 is a flowchart of still another service data transmission method according to Embodiment 1 of the present invention.
Figure 5:
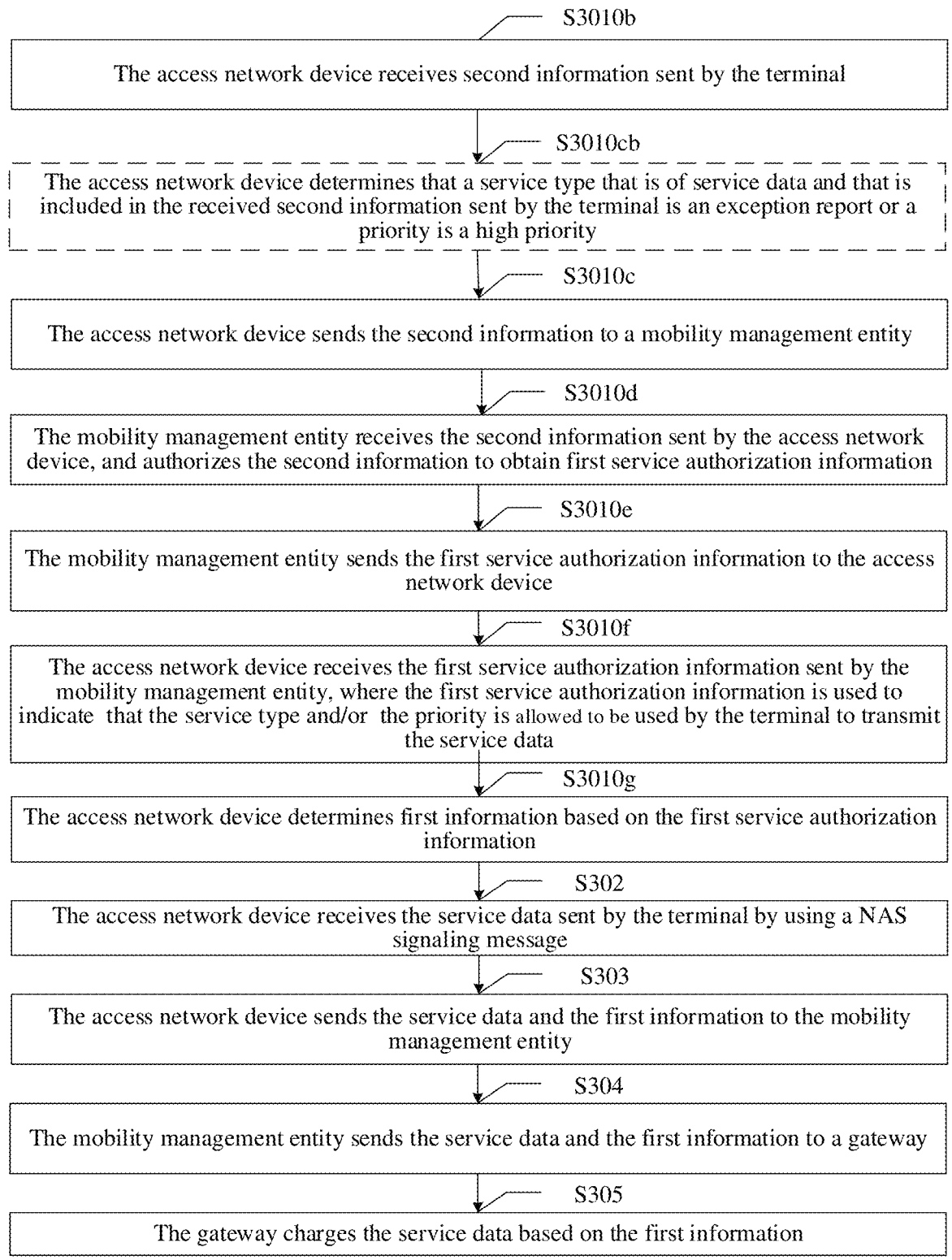
FIG. 5 is a flowchart of yet another service data transmission method according to Embodiment 1 of the present invention.

Optionally, step S301 may specifically include S3010a (as shown in FIG. 4) or S3010b to S3010g (as shown in FIG. 5).

S3010a: The access network device receives the first information sent by the terminal.

Optionally, the access network device receives a Radio Resource Control (RRC) connection setup request message sent by the terminal, and the connection setup request message carries the first information.

S3010b: The access network device receives second information sent by the terminal.

The second information may include the service type and/or the priority that is used by the terminal to request to transmit the service data.

Optionally, the access network device receives an RRC connection setup request message sent by the terminal, and the connection setup request message carries the second information.

S3010c: The access network device sends the second information to the mobility management entity.

S3010d: The mobility management entity receives the second information sent by the access network device, and authorizes the second information to obtain first service authorization information.

Specifically, when authorizing the received second information that is sent by the access network device, the mobility management entity authorizes the second information based on subscription information of the terminal to obtain the first service authorization information.

The first service authorization information may include indication information, and the indication information is used to indicate that the second information is allowed or rejected.

S3010e: The mobility management entity sends the first service authorization information to the access network device.

S3010f: The access network device receives the first service authorization information sent by the mobility management entity, where the first service authorization information is used to indicate that the service type and/or the priority is allowed to be used by the terminal to transmit the service data.

S3010g: The access network device determines the first information based on the first service authorization information.

The first service authorization information may include the indication information, and the indication information is used to indicate that the second information is allowed.

The first information includes at least one of the service type of the service data to be sent by the terminal and the priority of the service data.

Specifically, if the first service authorization information indicates that the second information is allowed, the first information determined by the access network device is the same as the second information. If the first service authorization information indicates that the second information is rejected, the first information determined by the access network device is different from the second information. For example, the service type included in the second information is the exception report. If the first service authorization information indicates that the terminal is allowed to send the exception report, the service type included in the first information determined by the access network device is the exception report. If the first service authorization information indicates that the terminal is rejected to send the exception report, the service type included in the first information determined by the access network device is the periodic report.

Specifically, when authorizing the second information to obtain the first service authorization information, the mobility management entity authorizes the second information based on subscription information of the terminal to obtain the first service authorization information.

In a possible implementation, the subscription information may include a priority or a service type of service data allowed to be sent by the terminal. For example, the service type that is of the service data allowed to be sent by the terminal and that is included in the subscription information is the periodic report. If the second information is the exception report, the first service authorization information obtained by authorizing the second information by the mobility management entity based on the subscription information indicates that the second information is rejected.

In this embodiment of the present invention, a priority or a service type of service data that can be sent is configured for each terminal, to prevent a low-priority terminal (a terminal centering on the periodic report, for example, an intelligent water meter) from using a high-priority report, thereby avoiding data transmission congestion due to that most terminals all send service data by using a high-priority report.

In another possible implementation, the subscription information may include a priority of service data allowed to be sent by the terminal and quota information corresponding to the priority, and the quota information corresponding to the priority is used to indicate a volume of service data that is of the priority and that is allowed to be sent within a particular time. The priority herein is a high priority. The volume may be traffic of the service data, a quantity of times of sending the service data, or the like.

In this embodiment of the present invention, the priority of the service data that can be sent and the quota information corresponding to the priority are configured for each terminal, so that when service data that is of a high priority and that is sent by the terminal exceeds the quota information, a request is rejected, and the terminal sends the service data at a low priority, to prevent a low-priority terminal (a terminal centering on the periodic report, for example, an intelligent water meter) from overusing a high-priority report, thereby avoiding data transmission congestion due to that most terminals all send service data by using a high-priority report.

In still another possible implementation, the subscription information may include a service type of service data allowed to be sent by the terminal and quota information corresponding to the service type, and the quota information corresponding to the service type is used to indicate a volume of service data that is of the service type and that is allowed to be sent within a particular time.

In this embodiment of the present invention, the service type of the service data that can be sent and the quota information are configured for each terminal, so that when service data that is sent by the terminal and whose service type is the exception report exceeds the quota information, a request is rejected, and the service data is sent based on the periodic report, to prevent a low-priority terminal (a terminal centering on the periodic report, for example, an intelligent water meter) from overusing the exception report, thereby avoiding data transmission congestion due to that most terminals all transmit service data by using the exception report.

Optionally, when the service type that is of the service data and that is included in the second information that is received by the access network device and sent by the terminal is the exception report or the priority of the service data is a high priority, the access network device sends the second information of the service data to the mobility management entity to authorize. Therefore, before step S3010c, the method further includes S3010cb: The access network device determines that a service type that is of the service data and that is included in the received second information sent by the terminal is an exception report or a priority is a high priority.

If determining that the service type that is of the service data and that is included in the received second information sent by the terminal is the periodic report or the priority is a low priority, the access network device may not request the mobility management entity to authorize the second information but directly send the second information to the gateway, so that the gateway charges the service data.

Figure 6:
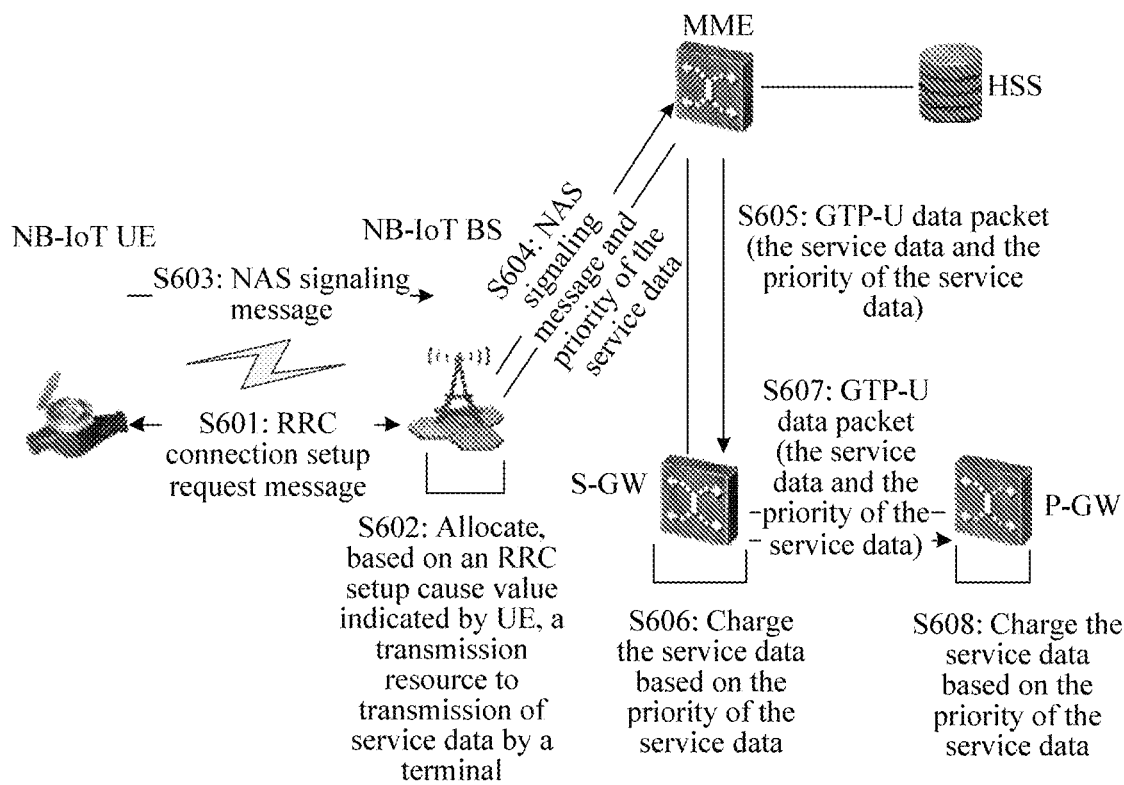
FIG. 6 is a schematic diagram of a service data transmission method according to Embodiment 1 of the present invention.

The embodiment corresponding to FIG. 4 is specifically described below by using an EPS system as an example, as shown in FIG. 6. Descriptions are as follows by using an example in which the access network device is a base station, the terminal is referred to as UE, the mobility management entity is an MME, and the gateway includes an S-GW and a P-GW.

S601: The UE initiates an RRC connection setup request message to the base station (BS).

An RRC setup cause value indicates first information. The first information includes at least one of a priority of the service data and a service type of the service data. The priority is used as an example in this embodiment. The priority includes a first priority and a second priority, and the first priority is higher than the second priority.

S602: The base station allocates, based on an RRC setup cause value indicated by the UE, a transmission resource to transmission of service data by the terminal.

S603: The UE encapsulates the service data into a NAS signaling message and sends the NAS signaling message to the base station.

Specifically, the NAS signaling message may be transmitted to the base station by using an RRC connection setup complete message.

When sending the service data, the terminal sends the service data to the base station by using the transmission resource allocated by the base station.

S604: The base station receives the NAS signaling message sent by the terminal, and sends the NAS signaling message and a priority corresponding to the service data to the MME.

When sending the service data and the priority of the service data to the MME, the base station may send the service data and the priority by using an interface SLAP initial UE message.

S605: After receiving the NAS signaling message and the priority of the service data, the MME obtains the service data from the NAS signaling message, and sends the service data and the priority of the service data to the S-GW.

Specifically, the MME encapsulates the service data into a GPRS Tunneling Protocol-User Plane (GTP-U) data packet and sends the GTP-U data packet to the S-GW. A header of the GTP-U data packet carries the priority of the service data.

S606: The S-GW charges the service data based on the priority of the service data. The S-GW may generate an S-GW charging data record (CDR), and the CDR records the priority of the service data.

S607: The S-GW sends the service data and the priority of the service data to the P-GW.

Specifically, the S-GW encapsulates the service data into the GTP-U data packet and sends the GTP-U data packet to the S-GW, and the header of the GTP-U data packet carries the priority of the service data.

S608: The P-GW charges the service data based on the priority of the service data.

The P-GW may generate a P-GW CDR, and the CDR records the priority of the service data.

Before sending the service data, the terminal sends the priority of the service data to the base station, so that after receiving the service data sent by the terminal, the base station sends the service data and the priority of the service data to the P-GW and the S-GW by using the MME, and the P-GW and the S-GW perform charging control on the service data based on the priority of the service data, that is, different charging standards are used for transmission of high-priority service data and transmission of low-priority service data. The base station sends the priority of the service data to the P-GW and the S-GW when transmitting the service data, so that the P-GW and the S-GW provide a charging service for the service data based on the priority of the service data. In addition, a low-priority terminal (a terminal centering on a periodic report) is further prevented from transmitting service data by overusing a high priority report, thereby reducing data transmission congestion due to that most terminals all send service data by using a high-priority report.

Figure 7:
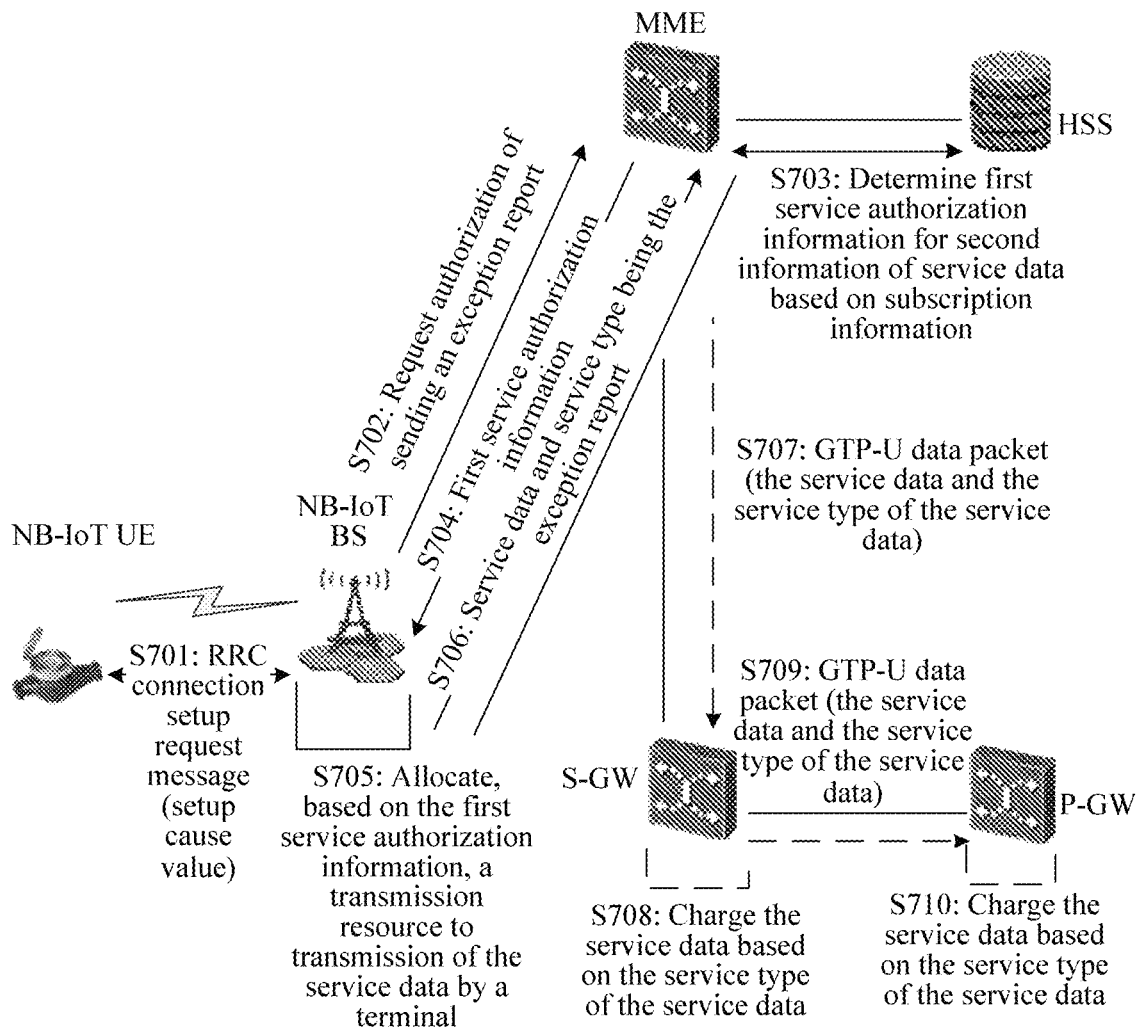
FIG. 7 is a schematic diagram of another service data transmission method according to Embodiment 1 of the present invention.

The embodiment corresponding to FIG. 5 is specifically described below by using an EPS system as an example, as shown in FIG. 7. The access network device is an NB-IoT BS, the terminal is NB-IoT UE, the mobility management entity is an MME, and the gateway includes an S-GW and a P-GW.

S701: The UE initiates an RRC connection setup request message to the base station.

An RRC setup cause value in the RRC connection setup request message indicates second information. The second information includes a priority and/or a service type that is used by the UE to request to transmit service data. The service type is used as an example in this embodiment. The service type may be an exception report or a periodic report, and a first priority is higher than a second priority.

S702: After receiving the RRC connection setup request message, the base station determines that a service type indicated by an RRC setup cause value indicated by the UE is an exception report and requests, from the MME, authorization of sending the exception report.

S703: The MME determines first service authorization information for second information of service data based on subscription information, where the first service authorization information is used to indicate that the service type is allowed to be used by the terminal to transmit the service data.

In a possible implementation, the subscription information may include the service type that is of the service data and that can be used to allow the terminal to transmit the service data. If the subscription information indicates that the terminal is not allowed to send the exception report, the first service authorization information instructs the access network device to schedule, based on the periodic report, a transmission resource required by the service data. If the subscription information indicates that the terminal is allowed to send the exception report, the first service authorization information instructs the access network device to schedule, based on the exception report, a transmission resource required by the service data. That is, the first service authorization information indicates that the second information is allowed or rejected.

In a possible implementation, the subscription information may include the exception report used to allow the terminal to transmit the service data and quota information corresponding to the exception report, and the quota information is used to indicate a volume of service data whose service type is the exception report and that is allowed to be sent within a particular time. The volume may be traffic of the service data, a quantity of times of sending the service data, or the like. When determining that a volume of service data whose service type is the exception report and that needs to be sent by the terminal exceeds the quota information, the MME rejects a request and instructs the access network device to schedule the transmission resource of the service data based on the periodic report. When determining that a volume of service data whose service type is the exception report and that needs to be sent by the terminal does not exceed the quota information, the MME accepts a request and instructs the access network device to schedule the transmission resource of the service data based on the exception report. Alternatively, the MME may generate third service authorization information based on the subscription information, and send the third service authorization information to the access network device. The third service authorization information indicates that the terminal is allowed to transmit service data by using the exception report and includes quota information corresponding to the exception report, so that when determining, based on the third service authorization information, that the terminal can send the service data whose service type is the exception report, the access network device allocates, based on the exception report, the transmission resource to the service data needing to be sent by the terminal. Otherwise, the access network device allocates, based on the periodic report, the transmission resource to the service data needing to be sent by the terminal.

S704: The MME sends the first service authorization information to the base station.

S705: The base station allocates, based on the first service authorization information, a transmission resource to transmission of the service data by the terminal.

S706: After receiving the service data sent by the terminal by using a NAS signaling message, the base station forwards the service data to the MME, and notifies the MME that the service type of the service data is the exception report.

S707: After receiving the service data and the service type of the service data, the MME sends the service data and the service type of the service data to the S-GW.

Specifically, the MME encapsulates the service data into a GTP-U data packet and sends the GTP-U data packet to the S-GW. A header of the GTP-U data packet carries the service type of the service data.

S708: The S-GW charges the service data based on the service type of the service data. The S-GW may generate a CDR, and the CDR records the service type of the service data.

S709: The S-GW sends the service data and the service type of the service data to the P-GW.

Specifically, the S-GW encapsulates the service data into the GTP-U data packet and sends the GTP-U data packet to the S-GW, and the header of the GTP-U data packet carries the service type of the service data.

S710: The P-GW charges the service data based on the service type of the service data.

The P-GW may generate a P-GW CDR, and the CDR records the service type of the service data.

Figure 8:
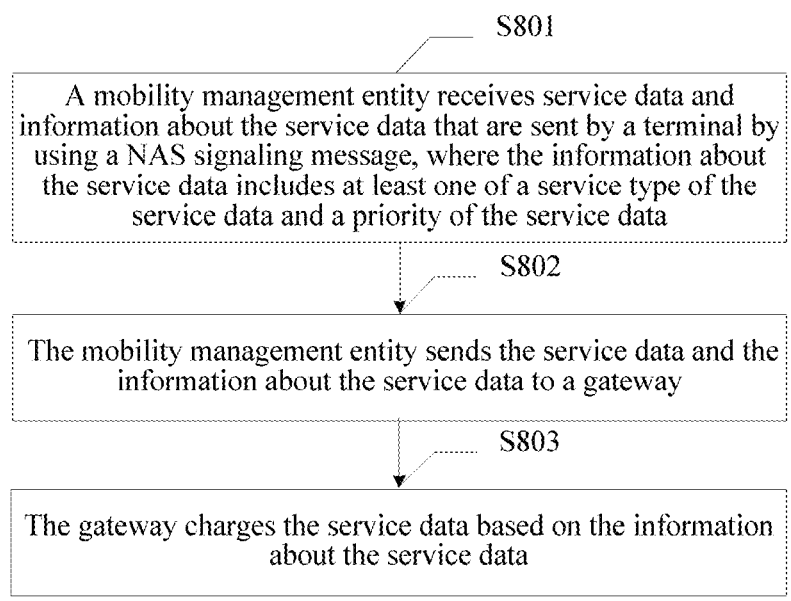
FIG. 8 is a flowchart of yet another service data transmission method according to Embodiment 1 of the present invention.

The second implementation scenario of Embodiment 1 is described below, that is, the mobility management entity receives the NAS signaling message sent by the terminal. The NAS signaling message carries the service data of the terminal and the first information of the service data. Refer to FIG. 8.

S801: The mobility management entity receives the service data and information about the service data that are sent by the terminal by using the NAS signaling message, where the information about the service data includes at least one of the service type and the priority.

S802: The mobility management entity sends the service data and the information about the service data to the gateway.

S803: The gateway charges the service data based on the information about the service data.

In this embodiment of the present invention, the terminal sends the service data and the information about the service data to the mobility management entity by using the NAS signaling message, and the mobility management entity sends the service data and the information about the service data to the gateway, so that the gateway charges the service data based on the information about the service data. Charging control is performed on service data of different service types or priorities, to control the terminal to configure the service type or the priority of the service data based on a requirement when sending the service data, thereby preventing a low-priority terminal, for example, a terminal (an intelligent water meter) centering on the periodic report, from overusing a high-priority report (the exception report).

Figure 9:
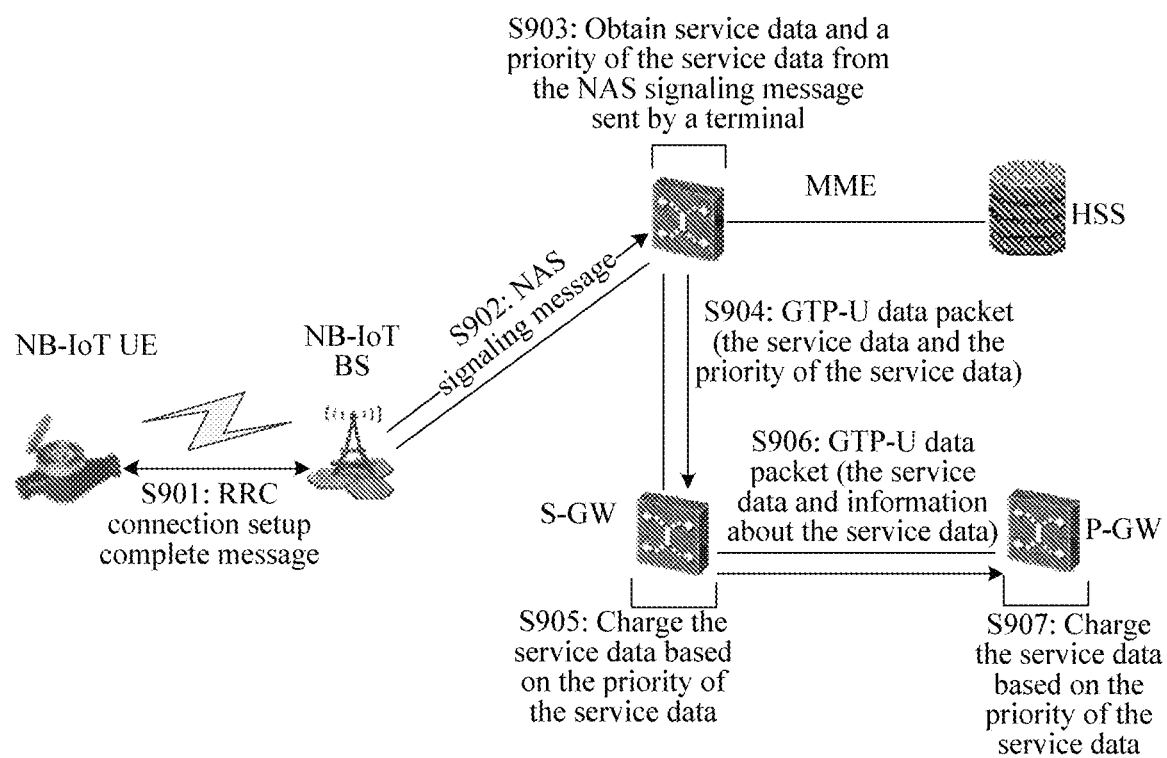
FIG. 9 is a schematic diagram of still another service data transmission method according to Embodiment 1 of the present invention.

The second implementation scenario corresponding to FIG. 8 is specifically described below by using an EPS system as an example, as shown in FIG. 9. The access network device is a base station, the terminal is UE, the mobility management entity includes an MME, and the gateway includes an S-GW and a P-GW.

S901: The base station receives an RRC connection setup complete message sent by the terminal, where the message carries a NAS signaling message including service data and information about the service data.

S902: The base station forwards the received NAS signaling message to the MME.

S903: The MME obtains the service data and the information about the service data from the NAS signaling message sent by the terminal, where the information about the service data includes at least one of a service type of the service data and a priority of the service data. In this embodiment, an example in which the information about the service data includes the priority of the service data is used.

S904: After obtaining the service data and the priority of the service data, the MME sends the service data and the priority of the service data to the S-GW.

Specifically, the MME encapsulates the service data into a GTP-U data packet and sends the GTP-U data packet to the S-GW, and a header of the GTP-U data packet carries the priority of the service data.

S905: The S-GW charges the service data based on the priority of the service data. The S-GW may generate a charging data S-GW CDR, and the CDR records the priority of the service data.

S906: The S-GW sends the service data and the priority of the service data to the P-GW.

Specifically, the S-GW encapsulates the service data into the GTP-U data packet and sends the GTP-U data packet to the S-GW, and the header of the GTP-U data packet carries the priority of the service data.

S907: The P-GW charges the service data based on the priority of the service data.

The P-GW may generate a P-GW CDR, and the CDR records the priority of the service data.

Embodiment 2

Figure 10:
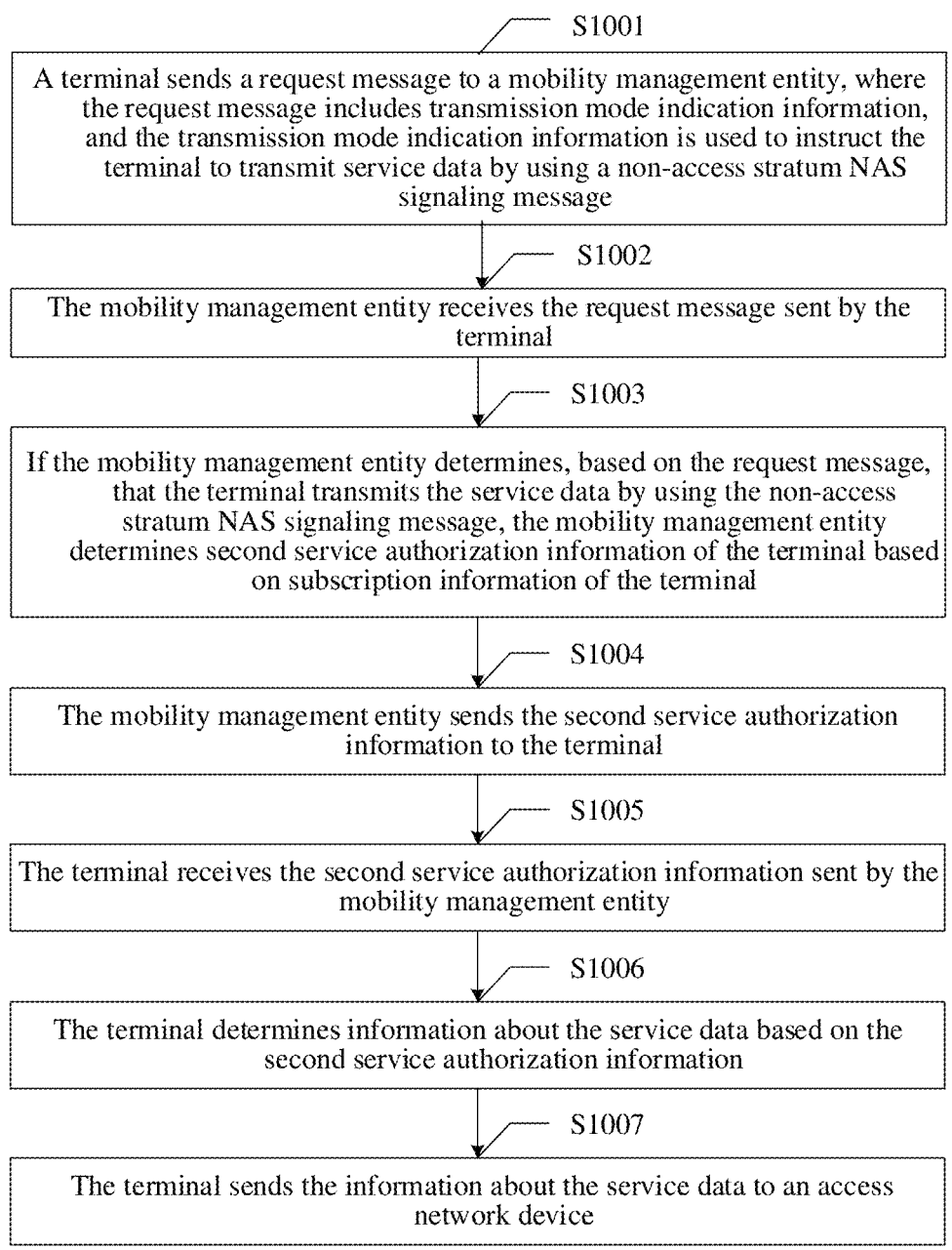
FIG. 10 is a flowchart of a service data transmission method according to Embodiment 2 of the present invention.

Based on the analysis of the quality of service requirement of the NB-IoT service, this embodiment of the present application provides a service data transmission method. A network side sends second service authorization information of a terminal to the terminal, and the second service authorization information is used to indicate a service type and/or a priority that is of service data that is allowed to be used by the terminal to transmit the service data, so that the terminal determines, based on the second service authorization information, information about the sent service data, where the information about the service data includes at least one of the service type of the service data and the priority of the service data, and notifies a base station of the information about the service data, so that the base station provides a service for transmission of the service data based on the information about the service data. As shown in FIG. 10, the method includes the following steps.

S1001: The terminal sends a request message to a mobility management entity, where the request message includes transmission mode indication information, and the transmission mode indication information is used to instruct the terminal to transmit the service data by using a NAS signaling message.

S1002: The mobility management entity receives the request message sent by the terminal.

S1003: If the mobility management entity determines, based on the request message, that the terminal transmits the service data by using the NAS signaling message, the mobility management entity determines the second service authorization information of the terminal based on subscription information of the terminal.

The second service authorization information includes information used to indicate the service type and/or the priority that is allowed to be used by the terminal to transmit the service data.

S1004: The mobility management entity sends the second service authorization information to the terminal.

S1005: The terminal receives the second service authorization information sent by the mobility management entity.

S1006: The terminal determines the information about the service data based on the second service authorization information.

The information about the service data includes at least one of the service type of the service data and the priority of the service data.

S1007: The terminal sends the information about the service data to an access network device.

Optionally, when the terminal initiates an attach request message to a network, the mobility management entity obtains the subscription information of the terminal from an HSS.

The subscription information may include a priority and/or a service type of service data allowed to be sent by the terminal. The mobility management entity generates the second service authorization information based on the priority and/or the service type of the service data allowed to be sent by the terminal, and sends the second service authorization information to the terminal, so that the terminal determines the service type and/or the priority of the service data allowed to be sent; and when receiving service data that an application layer requests to send, sets a priority of the service data and/or a service type of the service data based on the second service authorization information, to prevent a low-priority terminal from sending service data at a high priority.

Alternatively, the subscription information may include a priority of service data allowed to be sent by the terminal and second quota information, and the second quota information is used to indicate a volume of service data that is of the priority and that is allowed to be sent within a particular time. The priority herein is a high priority. The volume may be traffic of the service data, a quantity of times of sending the service data, or the like. The mobility management entity generates the second service authorization information based on the priority of the service data allowed to be sent by the terminal and the second quota information, and sends the second service authorization information to the terminal, so that when determining that a volume of sent service data of a high priority does not reach the second quota information, the terminal may send the service data at a high priority. When determining that a volume of sent service data of a high priority reaches the second quota information, the terminal can send the service data only at a low priority, to prevent a low-priority terminal from sending service data by overusing a high priority report.

Alternatively, the subscription information may indicate that a service type of service data allowed to be sent by the terminal is an exception report and include first quota information, and the first quota information is used to indicate a volume of service data whose service type is the exception report and that is allowed to be sent within a particular time. The mobility management entity generates the second service authorization information based on the service type of the service data allowed to be sent by the terminal and the first quota information and sends the second service authorization information to the terminal, so that when determining that a volume of sent service data whose service type is the exception report does not reach the first quota information, the terminal may send the service data based on the exception report. When determining that a volume of sent service data whose service type is the exception report reaches the first quota information, the terminal can send the service data based only on a periodic report, to prevent a low-priority terminal (a terminal centering on the periodic report) from sending service data by overusing a high priority report.

Figure 11:
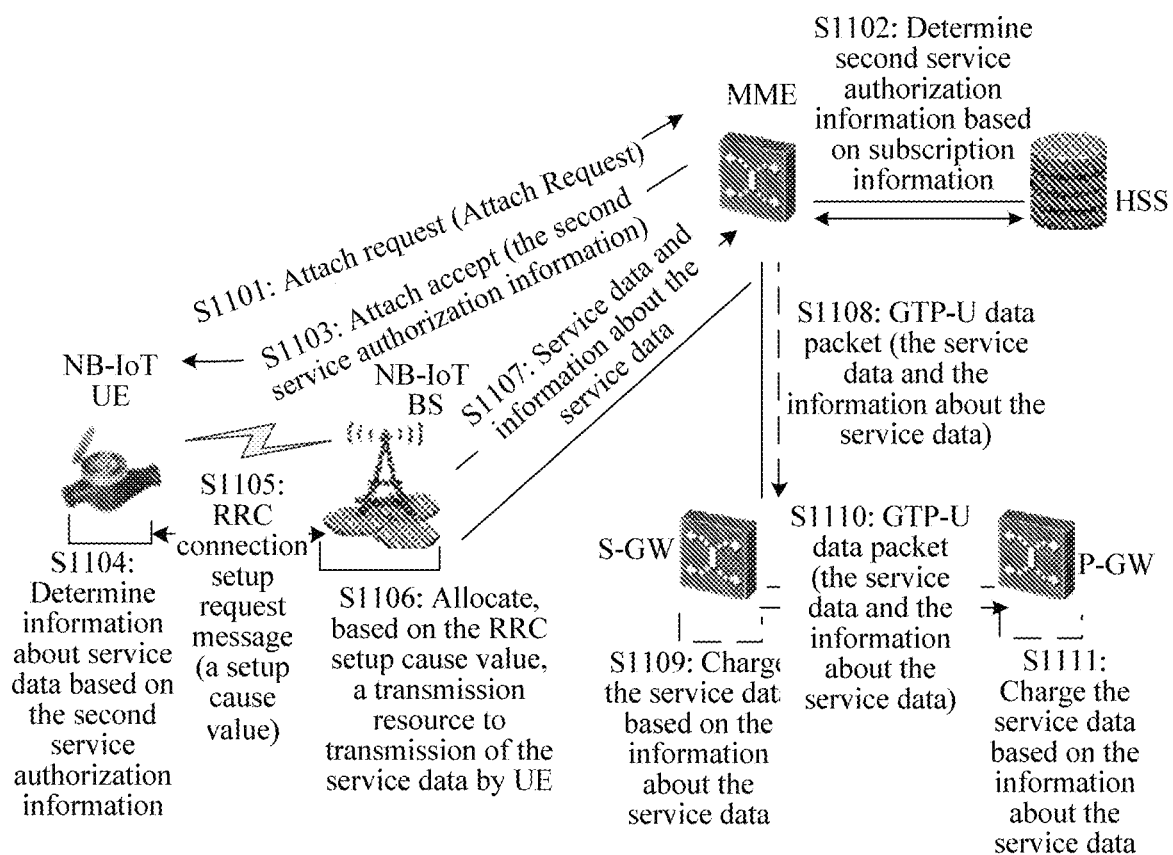
FIG. 11 is a schematic diagram of a service data transmission method according to Embodiment 2 of the present invention.

Embodiment 2 is specifically described below by using an EPS system as an example, as shown in FIG. 11. The access network device is a base station, the terminal is referred to as UE, the mobility management entity is an MME, and the gateway includes an 5-GW and a P-GW.

S1101: The UE sends a request message to the MME, where the request message includes transmission mode indication information, and the transmission mode indication information is used to instruct a terminal to transmit service data by using a NAS signaling message. Specifically, when initiating an attach request, the UE sends the transmission mode indication information to the mobility management entity.

S1102: After receiving the request message, the MME obtains subscription information of the UE from an HSS, and determines second service authorization information based on the subscription information. The second service authorization information includes information used to indicate that a service type and/or a priority that is used by the terminal to transmit the service data is allowed. The second service authorization information may further include first quota information, and the first quota information is used to indicate a volume of service data that is of the service type and that is allowed to be sent within a particular time. The second service authorization information may further include second quota information, and the second quota information is used to indicate a volume of service data that is of the priority and that is allowed to be sent within a particular time.

That is, it is determined whether the UE can send service data of a high priority or send an exception report, and the volume of the service data allowed to be sent is determined.

S1103: The MME notifies the UE of the second service authorization information by using an attach accept message.

S1104: When an application layer requests to send service data or an exception report at a high priority, the UE determines information about the service data based on the second service authorization information. The information about the service data includes at least one of the service type of the service data and the priority of the service data.

For example, the second service authorization information indicates a volume of service data that is of the high priority and that is allowed to be sent, and when determining that a volume of sent service data of the high priority does not reach the allowed volume, the UE may send the service data at a high priority. When a volume of sent service data of the high priority reaches the allowed volume, the UE sends the service data at a low priority.

S1105: The UE sends an RRC connection setup request message to the base station, and sets an RRC connection setup cause value based on the determined information about the service data.

S1106: The base station allocates, based on the RRC setup cause value, a transmission resource to transmission of the service data by the UE.

Therefore, the UE sends the service data to the base station by using the NAS signaling message based on the transmission resource allocated by the base station.

S1107: After receiving the service data sent by the UE, the base station forwards the service data to the MME, and notifies the MME of the information about the service data.

S1108: After receiving the service data and the information about the service data, the MME sends the service data and the information about the service data to the S-GW.

Specifically, the MME encapsulates the service data into a GTP-U data packet and sends the GTP-U data packet to the S-GW. A header of the GTP-U data packet carries the information about the service data.

S1109: The S-GW charges the service data based on the information about the service data. The S-GW may generate a CDR, and the CDR records the information about the service data.

S1110: The S-GW sends the service data and the information about the service data to the P-GW.

Specifically, the S-GW encapsulates the service data into the GTP-U data packet and sends the GTP-U data packet to the S-GW, and the header of the GTP-U data packet carries the information about the service data.

S1111: The P-GW charges the service data based on the information about the service data.

The P-GW may generate a P-GW CDR, and the CDR records QoS information of the service data.

According to an embodiment of the present invention, when determining that the terminal transmits the service data by using the NAS signaling message, the MME sends the second service authorization information of the terminal to the terminal, so that the terminal determines, based on the second service authorization information, the information about the sent service data, and notifies the base station of the information about the service data; and the base station provides a service for transmission of the service data based on the information about the service data. In addition, the base station sends the information about the service data to the P-GW and the S-GW, so that the P-GW and the S-GW charges the service data based on the information about the service data. Different charging standards are used for transmission of high-priority service data and transmission of low-priority service data through charging control, to prevent a low-priority terminal (a terminal centering on the periodic report) from transmitting the service data by overusing a high priority report, thereby reducing data transmission congestion due to that most terminals all send service data by using a high-priority report.

Embodiment 3

Figure 12:
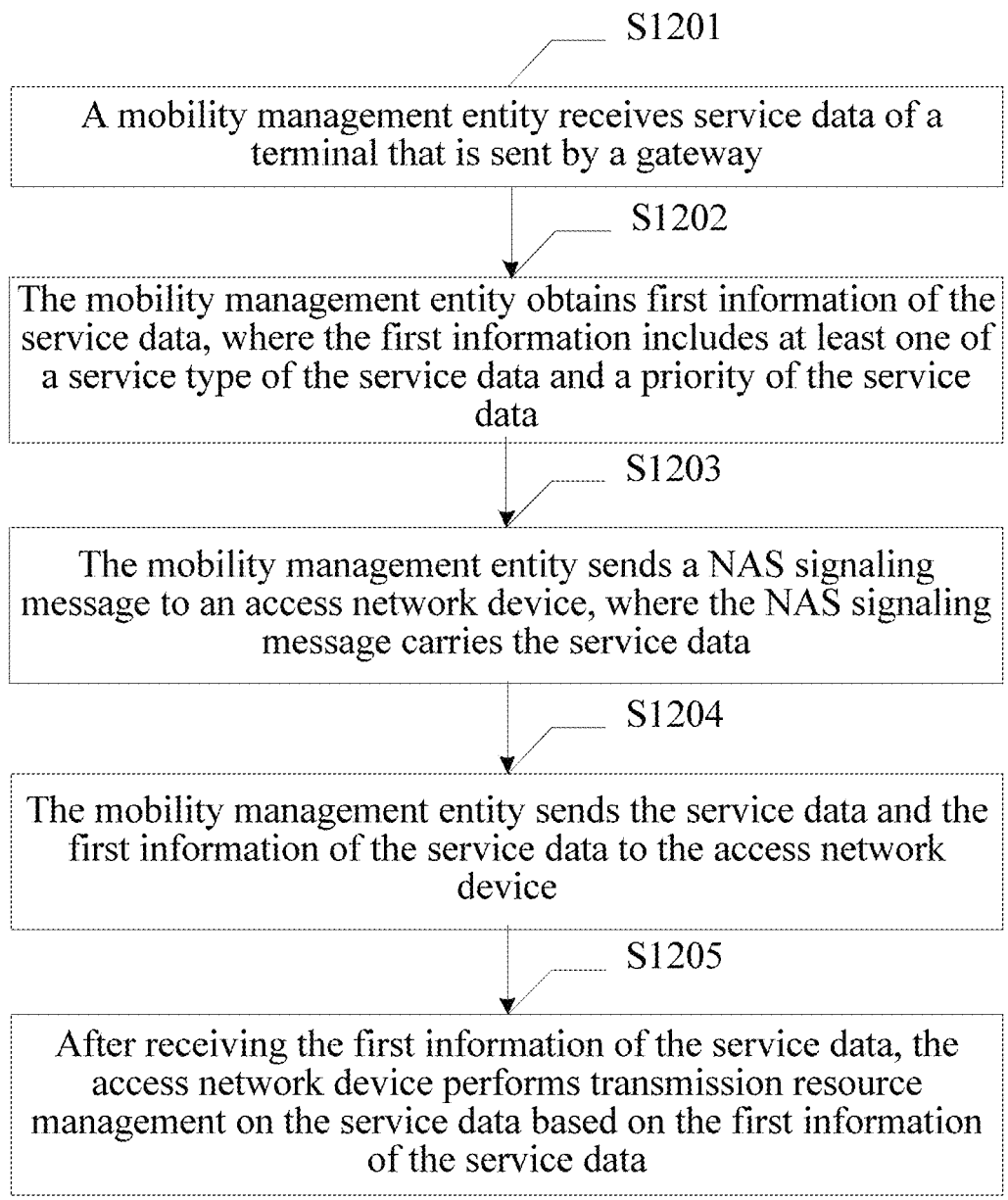
FIG. 12 is a flowchart of a service data transmission method according to Embodiment 3 of the present invention.
Figure 13:
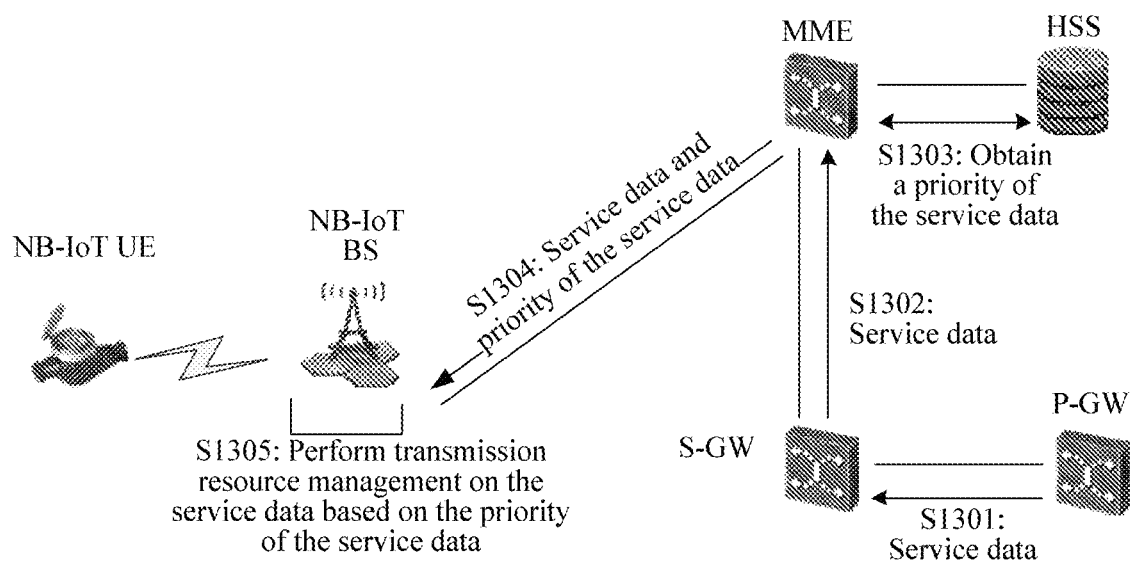
FIG. 13 is a schematic diagram of a service data transmission method according to Embodiment 3 of the present invention.

Based on the analysis of the quality of service requirement of the NB-IoT service, this embodiment of the present application provides a service data transmission method. A mobility management entity provides information about service data to an access network device, and the information about the service data includes a priority of the service data and/or a service type of the service data, so that the access network device performs transmission resource management on the service data based on the information about the service data. As shown in FIG. 12, the method includes the following steps.

S1201: The mobility management entity receives the service data of a terminal that is sent by a gateway.

Specifically, in an EPS system, the mobility management entity is an MME, and the gateway is an S-GW or a P-GW.

S1202: The mobility management entity obtains first information of the service data, where the first information includes at least one of the service type and the priority.

S1203: The mobility management entity sends a NAS signaling message to the access network device, where the NAS signaling message carries the service data.

S1204: The mobility management entity sends the service data and the first information of the service data to the access network device.

S1205: After receiving the first information of the service data, the access network device performs transmission resource management on the service data based on the first information of the service data.

Specifically, the performing transmission resource management on the service data based on the first information may be allocating a transmission resource, in other words, a network resource, to the to-be-sent service data based on the first information. For example, the service type of the service data to be transmitted by the terminal is an exception report, and the exception report has a requirement on a transmission delay. Therefore, the network resource allocated by the access network device to the service data needs to satisfy the delay requirement of the exception report.

Optionally, the obtaining, by the mobility management entity, first information of the service data may be implemented in the following manners:

First Implementation:

The mobility management entity determines the first information of the service data based on subscription information of the terminal.

The subscription information may include a priority and/or a service type of service data allowed to be sent by the terminal. For example, if the service type that is of the service data allowed to be sent by the terminal and that is included in the subscription information is a periodic report, the mobility management entity determines that the service type that is of the service data and that is included in the first information is the periodic report. Alternatively, if the service type that is of the service data allowed to be sent by the terminal and that is included in the subscription information is the exception report, the mobility management entity determines that the service type that is of the service data and that is included in the first information is the exception report.

Second Implementation:

The mobility management entity obtains the first information of the service data from a header of a data packet of the service data, where the header of the data packet of the service data carries the first information of the service data.

Specifically, the gateway may obtain the first information of the service data from a DSCP (IPv4) or a ToS (IPv6) that is carried in the service data.

In this embodiment of the present invention, the access network device in an EPS system is an eNB, the gateway in the EPS system is a P-GW or an S-GW, and the mobility management entity in the EPS system is an MME.

Embodiment 3 is specifically described below by using a specific application scenario (where the EPS system is used as an example in the present invention), as shown in FIG. 12.

S1301: The P-GW sends service data of the terminal to the S-GW.

S1302: After receiving the service data, the S-GW sends the service data to the MME.

S1303: After receiving the service data, the MME obtains first information of the service data from an HSS. When a header of a data packet of the service data carries the first information, the MME may alternatively obtain the first information of the service data from the header of the data packet of the service data. In this embodiment, the priority of the service data is used as an example of the first information.

The header of the data packet of the service data carries a differentiated services code point (DSCP) or a type of service (ToS), and the DSCP or the ToS includes the first information.

S1304: The MME sends the service data and the priority of the service data to the base station.

The MME determines the priority of the service data, generates an ARP or another priority parameter, when sending a downlink NAS transport message, adds the service data and the corresponding priority parameter to the downlink NAS transport message, and sends the downlink NAS transport message to the base station.

S1305: After receiving the service data and the priority of the service data, the base station performs transmission resource management on the service data based on the priority of the service data.

Specifically, the base station allocates a network resource to the service data based on the priority of the service data, so that the base station sends the service data to the terminal by using the allocated network resource.

Figure 14:
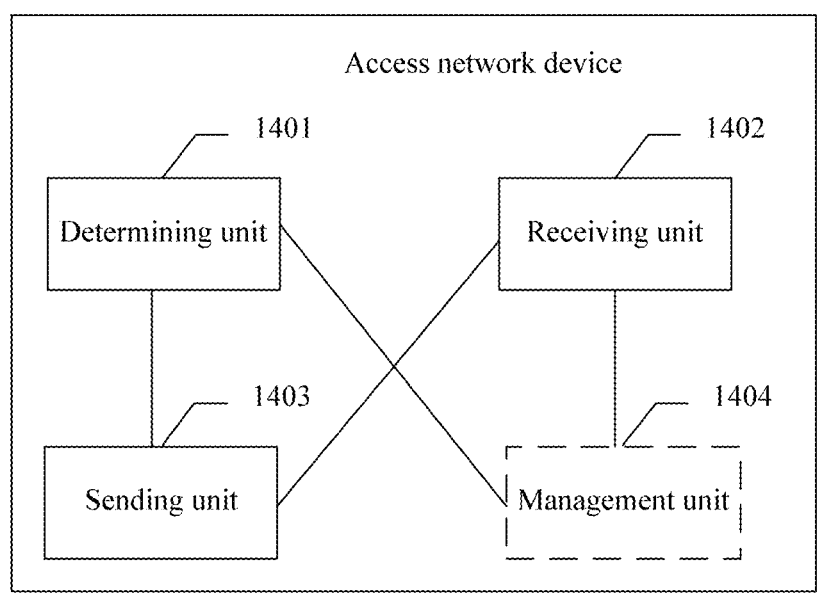
FIG. 14 is a schematic diagram of an access network device according to an embodiment of the present invention.

An embodiment of the present application further provides an access network device. As shown in FIG. 14, the access network device includes:

a determining unit 1401, configured to determine first information of service data to be sent by a terminal, where the first information includes at least one of a service type and a priority;

a receiving unit 1402, configured to receive the service data sent by the terminal by using a NAS signaling message; and a sending unit 1403, configured to send the service data received by the receiving unit 1402 and the first information determined by the determining unit 1401 to a gateway, so that the gateway charges the service data based on the first information.

In a possible design, the access network device may further include a management unit 1404, configured to perform transmission resource management on the service data based on the first information after the determining unit 1401 determines the first information of the service data to be sent by the terminal and before the receiving unit 1402 receives the service data sent by the terminal by using the NAS signaling message.

In a possible design, the determining unit 1401 is specifically configured to determine the first information when the receiving unit 1402 receives the first information sent by the terminal.

In a possible design, the receiving unit 1402 is further configured to receive second information sent by the terminal, where the second information includes the service type and/or the priority that is used by the terminal to request to transmit the service data.

The sending unit 1403 is further configured to send the second information to a mobility management entity.

The receiving unit 1402 is further configured to receive first service authorization information sent by the mobility management entity, where the first service authorization information is used to indicate that the service type and/or the priority is allowed to be used by the terminal to transmit the service data.

The determining unit 1401 is specifically configured to determine the first information based on the first service authorization information.

In a possible design, the first service authorization information includes indication information, and the indication information is used to indicate that the second information is allowed.

In this embodiment of the present invention, the unit division is an example, is merely logical function division, and may be other division in an actual implementation. In addition, functional units in each embodiment of the present application may be integrated into one processor or may exist alone physically. Alternatively, two or more units may be integrated into one unit. The foregoing integrated unit may be implemented in a form of hardware, or may be implemented in a form of a software functional module.

Figure 15:
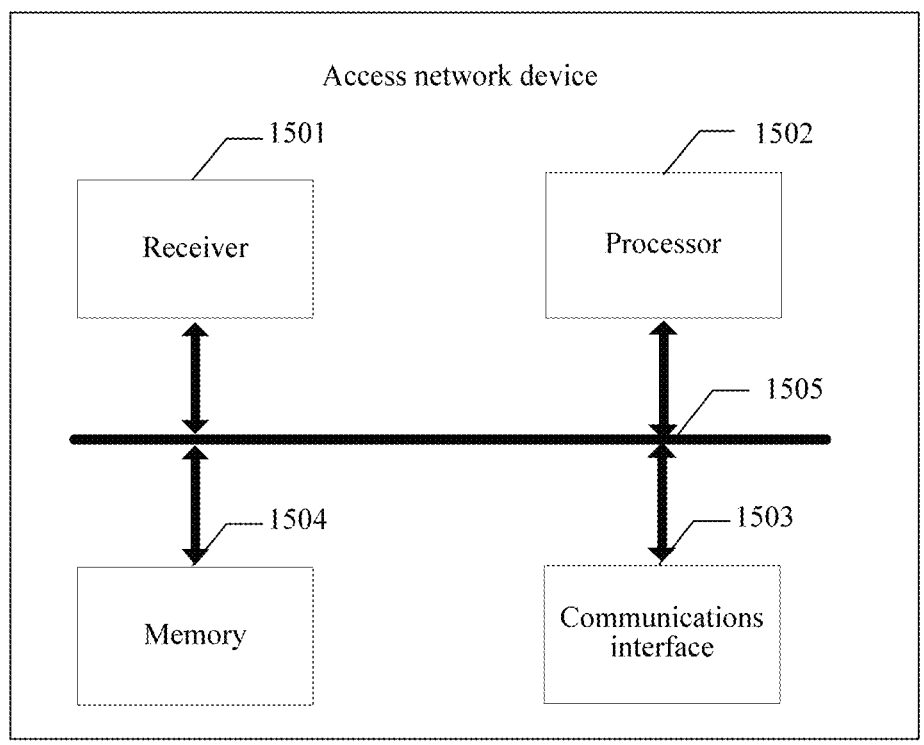
FIG. 15 is a schematic diagram of another access network device according to an embodiment of the present invention.

When the integrated unit is implemented in the form of hardware, as shown in FIG. 15, the access network device may include a receiver 1501, a processor 1502, and a communications interface 1503, and further includes a memory 1504. The memory 1504 is configured to store program code executed by the processor 1502. Physical hardware corresponding to the sending unit 1403 may be the communications interface 1503, physical hardware corresponding to the receiving unit 1402 may be the receiver 1501, and physical hardware corresponding to the determining unit 1401 and the management unit 1404 may be the processor 1502.

The processor 1502 may be a central processing unit (CPU), a digital processing unit, or the like. The processor 1502 receives, by using the receiver 1501, a message sent by the terminal, and receives a message from or sends a message to the gateway and the mobility management entity by using the communications interface 1503.

A specific connection medium between the receiver 1501, the processor 1502, the communications interface 1503, and the memory 1504 is not limited in this embodiment of the present invention. In this embodiment of the present invention, the receiver 1501, the processor 1502, the communications interface 1503, and the memory 1504 are connected by using a bus 1505 in FIG. 15. The bus is represented by using a thick line in FIG. 15, and a connection manner between other components is merely described as an example, and is not limited thereto. The bus may be classified into an address bus, a data bus, a control bus, and the like. For ease of representation, only one thick line is used to represent the bus in FIG. 15, but this does not mean that there is only one bus or only one type of bus.

The memory 1504 may be a volatile memory, such as a random-access memory (RAM). Alternatively, the memory 1504 may be a non-volatile memory, such as a read-only memory (ROM), a flash memory, a hard disk drive (HDD), or a solid-state drive (SSD). Alternatively, the memory 1504 is any other medium that can be used to carry or store expected program code that has an instruction or data structure form and that can be accessed by a computer, but is not limited thereto. The memory 1504 may be a combination of the foregoing memories.

The processor 1502 is configured to determine first information of service data to be sent by the terminal, where the first information includes at least one of a service type and a priority.

The receiver 1501 is configured to receive the service data sent by the terminal by using a NAS signaling message.

The communications interface 1503 is configured to send the service data and the first information to the gateway, so that the gateway charges the service data based on the first information.

In a possible design, after the processor 1502 determines the first information of the service data to be sent by the terminal and before the receiver 1501 receives the service data sent by the terminal by using the NAS signaling message, the processor 1502 is further configured to perform transmission resource management on the service data according to the first information.

In a possible design, the receiver 1501 is further configured to receive the first information sent by the terminal.

In a possible design, the receiver 1501 is further configured to receive second information sent by the terminal, where the second information includes the service type and/or the priority that is used by the terminal to request to transmit the service data.

The communications interface 1503 is further configured to send the second information to the mobility management entity.

The communications interface 1503 is further configured to receive first service authorization information sent by the mobility management entity, where the first service authorization information is used to indicate that the service type and/or the priority is allowed to be used by the terminal to transmit the service data.

The processor 1502 is specifically configured to determine the first information based on the first service authorization information.

In a possible design, the first service authorization information includes indication information, and the indication information is used to indicate that the second information is allowed.

It should be noted that the access network device in the embodiment shown in FIG. 14 or FIG. 15 may be configured to perform operation steps of the access network device or the base station in the method in Embodiment 1 or each implementation scenario of Embodiment 1, and details are not described herein again.

Figure 16:
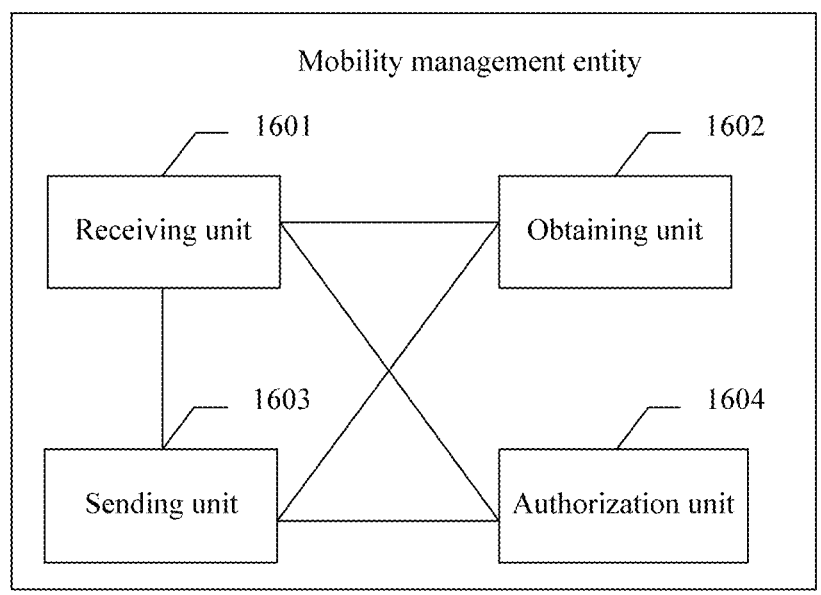
FIG. 16 is a schematic diagram of a mobility management entity according to an embodiment of the present invention.

An embodiment of the present application provides a mobility management entity. As shown in FIG. 16, the mobility management entity includes:

a receiving unit 1601, configured to receive a NAS signaling message, where the NAS signaling message carries service data of a terminal;

an obtaining unit 1602, configured to obtain first information of the service data received by the receiving unit 1601, where the first information includes at least one of a service type and a priority; and a sending unit 1603, configured to send the service data and the first information to a gateway, so that the gateway charges the service data.

In a possible design, the obtaining unit 1602 is specifically configured to obtain the first information when the receiving unit 1601 receives the first information sent by an access network device.

In a possible design, before receiving the first information sent by the access network device, the receiving unit 1601 is further configured to receive second information sent by the access network device, where the second information includes the service type and/or the priority that is used by the terminal to request to transmit the service data.

The mobility management entity further includes an authorization unit 1604, configured to authorize the second information based on subscription information of the terminal to obtain first service authorization information, where the first service authorization information is used to indicate that the service type and/or the priority is allowed to be used by the terminal to transmit the service data.

The sending unit 1603 is further configured to send the first service authorization information to the access network device, so that the access network device determines the first information based on the first service authorization information.

In a possible design, the obtaining unit 1602 is specifically configured to obtain the first information when the receiving unit 1601 receives the first information sent by the terminal.

In this embodiment of the present invention, the unit division is an example, is merely logical function division, and may be other division in an actual implementation. In addition, functional units in each embodiment of the present application may be integrated into one processor or may exist alone physically. Alternatively, two or more units may be integrated into one unit. The foregoing integrated unit may be implemented in a form of hardware, or may be implemented in a form of a software functional module.

Figure 17:
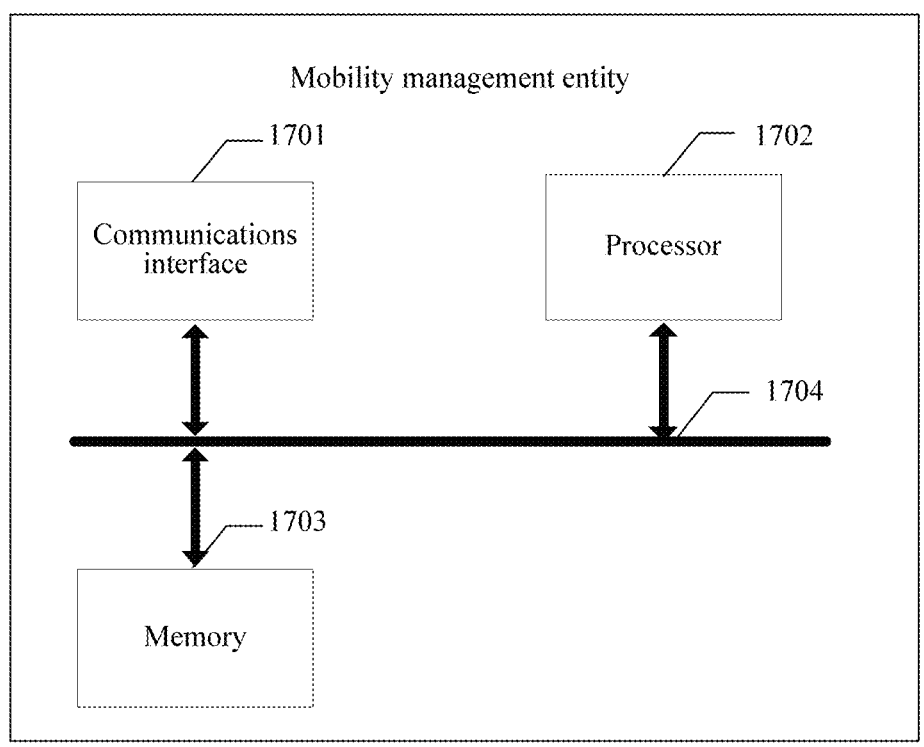
FIG. 17 is a schematic diagram of another mobility management entity according to an embodiment of the present invention.

When the integrated unit is implemented in the form of hardware, as shown in FIG. 17, the mobility management entity may include a communications interface 1701, a processor 1702, and a memory 1703. The memory 1703 is configured to store program code executed by the processor 1702. Physical hardware corresponding to the sending unit 1603 may be the communications interface 1701, physical hardware corresponding to the receiving unit 1601 may be the communications interface 1701, and physical hardware corresponding to the obtaining unit 1602 and the authorization unit 1604 may be the processor 1702.

The processor 1702 may be a central processing unit (CPU), a digital processing unit, or the like. The processor 1702 receives and sends messages by using the communications interface 1701.

A specific connection medium between the communications interface 1701, the processor 1702, and the memory 1703 are not limited in this embodiment of the present invention. In this embodiment of the present invention, the communications interface 1701, the processor 1702, and the memory 1703 are connected by using a bus 1704 in FIG. 17. The bus is represented by using a thick line in FIG. 17, and a connection manner between other components is merely described as an example, and is not limited thereto. The bus may be classified into an address bus, a data bus, a control bus, and the like. For ease of representation, only one thick line is used to represent the bus in FIG. 17, but this does not mean that there is only one bus or only one type of bus.

The memory 1703 may be a volatile memory, such as a RAM. Alternatively, the memory 1703 may be a non-volatile memory, such as a ROM, a flash memory, an HDD, or an SSD. Alternatively, the memory 1703 is any other medium that can be used to carry or store expected program code that has an instruction or data structure form and that can be accessed by a computer, but is not limited thereto. The memory 1703 may be a combination of the foregoing memories.

The communications interface 1701 is configured to receive a NAS signaling message, where the NAS signaling message carries service data of a terminal.

The processor 1702 is configured to obtain first information of the service data, where the first information includes at least one of a service type of the service data and a priority of the service data.

The communications interface 1701 is configured to send the service data and the first information to a gateway, so that the gateway charges the service data.

In a possible design, the communications interface 1701 is further configured to receive the first information sent by an access network device.

In a possible design, before receiving the first information sent by the access network device, the communications interface 1701 is further configured to receive second information sent by the access network device, where the second information includes the service type and/or the priority that is used by the terminal to request to transmit the service data.

The processor 1702 is further configured to authorize the second information based on subscription information of the terminal to obtain first service authorization information, where the first service authorization information is used to indicate that the service type and/or the priority is allowed to be used by the terminal to transmit the service data.

The communications interface 1701 is further configured to send the first service authorization information to the access network device, so that the access network device determines the first information based on the first service authorization information.

In a possible design, the communications interface 1701 is further configured to receive the first information sent by the terminal.

It should be noted that the mobility management entity in the embodiment shown in FIG. 16 or FIG. 17 may be configured to perform operation steps of the mobility management entity or the MME in the method in Embodiment 1 or each implementation scenario of Embodiment 1, and details are not described herein again.

Figure 18:
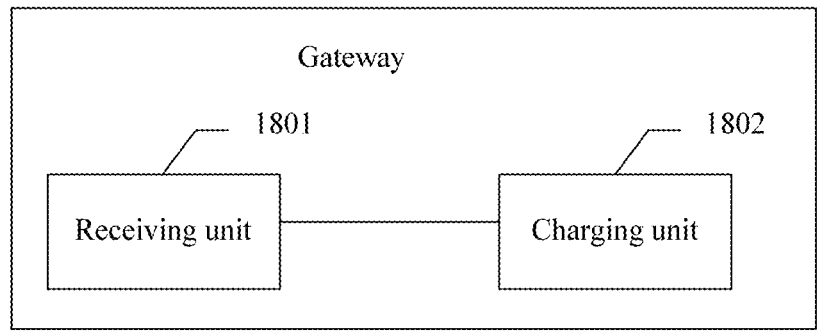
FIG. 18 is a schematic diagram of a gateway according to an embodiment of the present invention.

An embodiment of the present application further provides a gateway. As shown in FIG. 18, the gateway includes:

a receiving unit 1801, configured to receive service data of a terminal and first information of the service data that are sent by a mobility management entity, where the first information includes at least one of a service type and a priority; and a charging unit 1802, configured to charge the service data based on the first information received by the receiving unit 1801.

In this embodiment of the present invention, the unit division is an example, is merely logical function division, and may be other division in an actual implementation. In addition, functional units in each embodiment of the present application may be integrated into one processor or may exist alone physically. Alternatively, two or more units may be integrated into one unit. The foregoing integrated unit may be implemented in a form of hardware, or may be implemented in a form of a software functional module.

Figure 19:
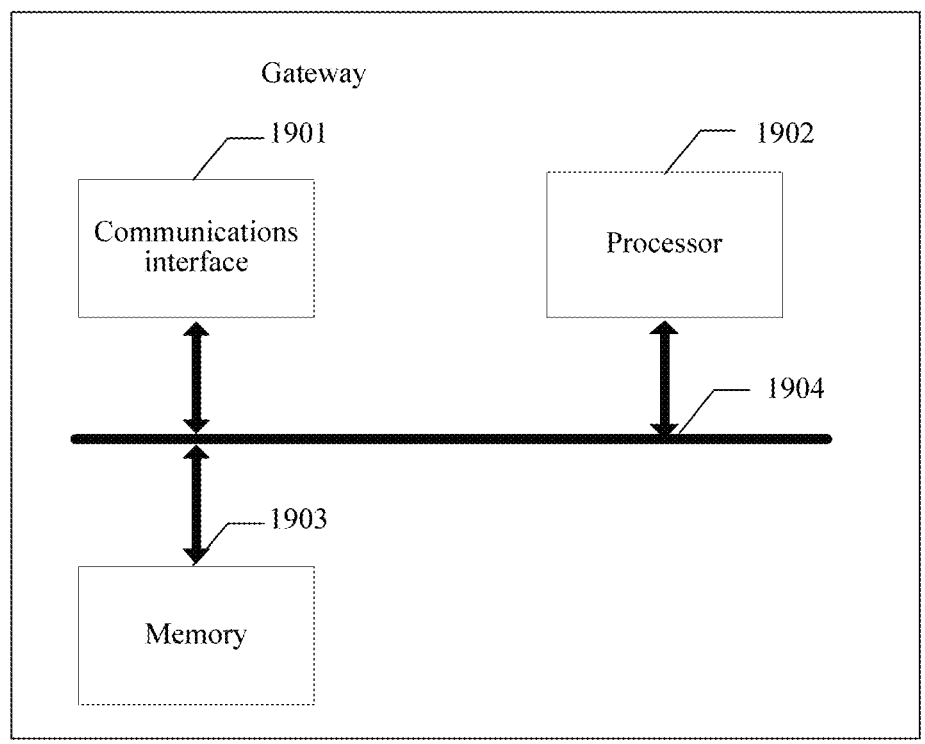
FIG. 19 is a schematic diagram of another gateway according to an embodiment of the present invention.

When the integrated unit is implemented in the form of hardware, as shown in FIG. 19, the gateway may include a communications interface 1901, a processor 1902, and a memory 1903. The memory 1903 is configured to store program code executed by the processor 1902. Physical hardware corresponding to the receiving unit 1801 may be the communications interface 1901, and physical hardware corresponding to the charging unit 1802 may be the processor 1902.

The processor 1902 may be a CPU, a digital processing unit, or the like. The processor 1902 receives and sends messages by using the communications interface 1901.

A specific connection medium between the communications interface 1901, the processor 1902, and the memory 1903 are not limited in this embodiment of the present invention. In this embodiment of the present invention, the communications interface 1901, the processor 1902, and the memory 1903 are connected by using a bus 1904 in FIG. 19. The bus is represented by using a thick line in FIG. 19, and a connection manner between other components is merely described as an example, and is not limited thereto. The bus may be classified into an address bus, a data bus, a control bus, and the like. For ease of representation, only one thick line is used to represent the bus in FIG. 19, but this does not mean that there is only one bus or only one type of bus.

The memory 1903 may be a volatile memory, such as a RAM. Alternatively, the memory 1903 may be a non-volatile memory, such as a ROM, a flash memory, an HDD, or an SSD. Alternatively, the memory 1903 is any other medium that can be used to carry or store expected program code that has an instruction or data structure form and that can be accessed by a computer, but is not limited thereto. The memory 1903 may be a combination of the foregoing memories.

The communications interface 1901 is configured to receive service data of a terminal and first information of the service data that are sent by a mobility management entity, where the first information includes at least one of a service type and a priority.

The processor 1902 is configured to charge the service data based on the first information received by the communications interface 1901.

It should be noted that the gateway in the embodiment shown in FIG. 18 or FIG. 19 may be configured to perform operation steps of the gateway, the S-GW, or the P-GW in the method in Embodiment 1 or each implementation scenario of Embodiment 1, and details are not described herein again.

Figure 20:
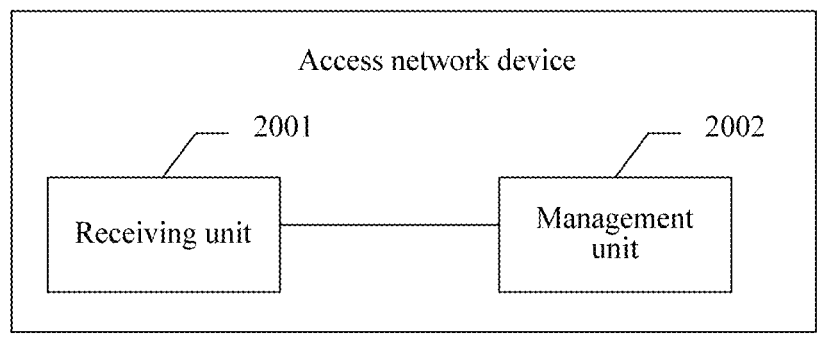
FIG. 20 is a schematic diagram of still another access network device according to an embodiment of the present invention.

An embodiment of the present application further provides another access network device. As shown in FIG. 20, the access network device includes:

a receiving unit 2001, configured to receive service data sent by a mobility management entity by using a NAS signaling message, and receive information that is about the service data and that is sent by the mobility management entity, where the information about the service data includes at least one of a service type of the service data and a priority of the service data; and a management unit 2002, configured to perform transmission resource management on the service data based on the information that is about the service data and that is received by the receiving unit 2001.

In this embodiment of the present invention, the unit division is an example, is merely logical function division, and may be other division in an actual implementation. In addition, functional units in each embodiment of the present application may be integrated into one processor or may exist alone physically. Alternatively, two or more units may be integrated into one unit. The foregoing integrated unit may be implemented in a form of hardware, or may be implemented in a form of a software functional module.

Figure 21:
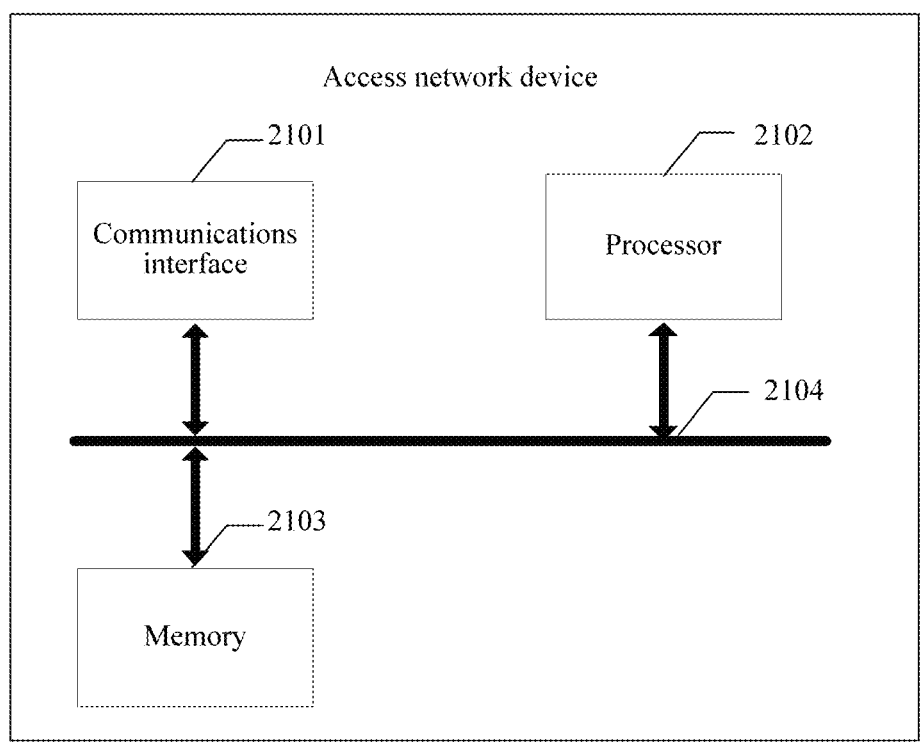
FIG. 21 is a schematic diagram of yet another access network device according to an embodiment of the present invention.

When the integrated unit is implemented in the form of hardware, as shown in FIG. 21, the access network device may include a communications interface 2101 and a processor 2102, and further includes a memory 2103. The memory 2103 is configured to store program code executed by the processor 2102. Physical hardware corresponding to the receiving unit 2001 may be the communications interface 2101, and physical hardware corresponding to the management unit 2002 may be the processor 2102. The communications interface 2101 is configured to send data or a message to a terminal.

The processor 2102 may be a CPU, a digital processing unit, or the like. The processor 2102 receives and sends messages by using the communications interface 2101.

A specific connection medium between the communications interface 2101, the processor 2102, and the memory 2103 are not limited in this embodiment of the present invention. In this embodiment of the present invention, the communications interface 2101, the processor 2102, and the memory 2103 are connected by using a bus 2104 in FIG. 21. The bus is represented by using a thick line in FIG. 21, and a connection manner between other components is merely described as an example, and is not limited thereto. The bus may be classified into an address bus, a data bus, a control bus, and the like. For ease of representation, only one thick line is used to represent the bus in FIG. 21, but this does not mean that there is only one bus or only one type of bus.

The memory 2103 may be a volatile memory, such as a RAM. Alternatively, the memory 2103 may be a non-volatile memory, such as a ROM, a flash memory, an HDD, or an SSD. Alternatively, the memory 2103 is any other medium that can be used to carry or store expected program code that has an instruction or data structure form and that can be accessed by a computer, but is not limited thereto. The memory 2103 may be a combination of the foregoing memories.

The communications interface 2101 is configured to receive service data sent by a mobility management entity by using a NAS signaling message, and receive information that is about the service data and that is sent by the mobility management entity, where the information about the service data includes at least one of a service type of the service data and a priority of the service data. The processor 2102 is configured to perform transmission resource management on the service data based on the information about the service data.

It should be noted that the access network device in the embodiment shown in FIG. 20 or FIG. 21 may be configured to perform operation steps of the access network device or the base station in the method in Embodiment 3 or each implementation scenario of Embodiment 3, and details are not described herein again.

Figure 22:
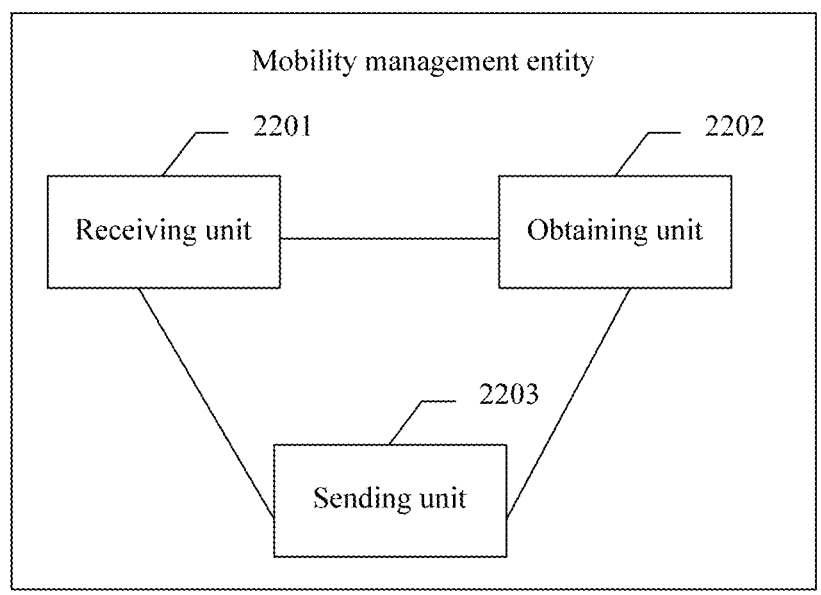
FIG. 22 is a schematic diagram of still another mobility management entity according to an embodiment of the present invention.

An embodiment of the present application provides a mobility management entity. As shown in FIG. 22, the mobility management entity includes:

a receiving unit 2201, configured to receive service data of a terminal that is sent by a gateway;

an obtaining unit 2202, configured to obtain first information of the service data received by the receiving unit 2201, where the first information includes at least one of a service type of the service data and a priority of the service data; and a sending unit 2203, configured to send a NAS signaling message to an access network device, where the NAS signaling message carries the service data obtained by the obtaining unit 2202; and send the first information to the access network device, so that the access network device performs transmission resource management on the service data based on the first information.

In a possible design, the obtaining unit 2202 is specifically configured to determine the first information based on subscription information of the terminal.

Alternatively, the obtaining unit 2202 obtains the first information from a header of a data packet of the service data, where the header of the data packet of the service data carries the first information.

In this embodiment of the present invention, the unit division is an example, is merely logical function division, and may be other division in an actual implementation. In addition, functional units in each embodiment of the present application may be integrated into one processor or may exist alone physically. Alternatively, two or more units may be integrated into one unit. The foregoing integrated unit may be implemented in a form of hardware, or may be implemented in a form of a software functional module.

Figure 23:
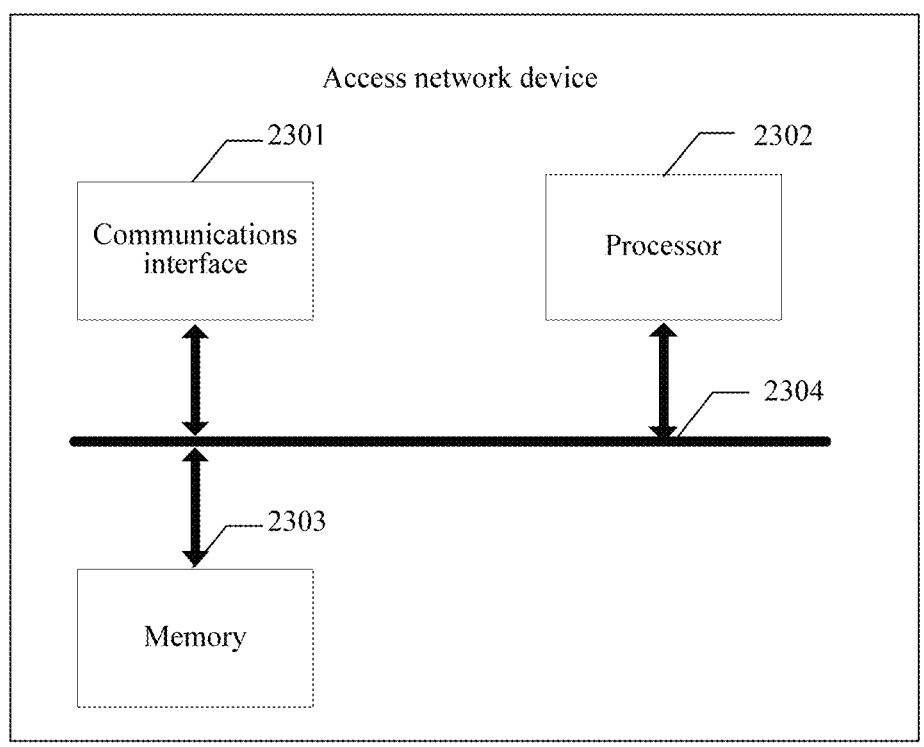
FIG. 23 is a schematic diagram of yet another mobility management entity according to an embodiment of the present invention.

When the integrated unit is implemented in the form of hardware, as shown in FIG. 23, the mobility management entity may include a communications interface 2301, a processor 2302, and a memory 2303. The memory 2303 is configured to store program code executed by the processor 2302. Physical hardware corresponding to the receiving unit 2201 may be the communications interface 2301, and physical hardware corresponding to the obtaining unit 2202 may be the processor 2302. Physical hardware corresponding to the sending unit 2203 may be the communications interface 2301.

The processor 2302 may be a CPU, a digital processing unit, or the like. The processor 2302 receives and sends messages by using the communications interface 2301.

A specific connection medium between the communications interface 2301, the processor 2302, and the memory 2303 are not limited in this embodiment of the present invention. In this embodiment of the present invention, the communications interface 2301, the processor 2302, and the memory 2303 are connected by using a bus 2304 in FIG. 23. The bus is represented by using a thick line in FIG. 23, and a connection manner between other components is merely described as an example, and is not limited thereto. The bus may be classified into an address bus, a data bus, a control bus, and the like. For ease of representation, only one thick line is used to represent the bus in FIG. 23, but this does not mean that there is only one bus or only one type of bus.

The memory 2303 may be a volatile memory, such as a RAM. Alternatively, the memory 2303 may be a non-volatile memory, such as a ROM, a flash memory, an HDD, or an SSD. Alternatively, the memory 2303 is any other medium that can be used to carry or store expected program code that has an instruction or data structure form and that can be accessed by a computer, but is not limited thereto. The memory 2303 may be a combination of the foregoing memories.

The communications interface 2301 is configured to receive service data of a terminal that is sent by a gateway.

The processor 2302 is configured to obtain first information of the service data, where the first information includes at least one of a service type of the service data and a priority of the service data.

The communications interface 2301 is configured to send a NAS signaling message to an access network device, where the NAS signaling message carries the service data; and send the first information to the access network device, so that the access network device performs transmission resource management on the service data based on the first information.

In a possible design, the processor 2302 is specifically configured to determine the first information based on subscription information of the terminal.

Alternatively, the processor 2302 is specifically configured to obtain the first information from a header of a data packet of the service data, where the header of the data packet of the service data carries the first information.

It should be noted that the mobility management entity in the embodiment shown in FIG. 22 or FIG. 23 may be configured to perform operation steps of the mobility management entity or the MME in the method in Embodiment 3 or each implementation scenario of Embodiment 3, and details are not described herein again.

Figure 24:
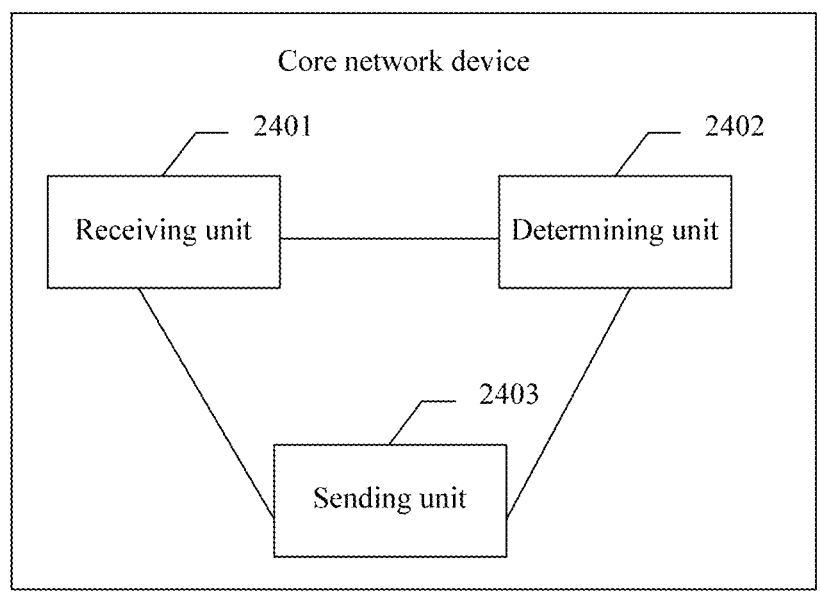
FIG. 24 is a schematic diagram of yet another mobility management entity according to an embodiment of the present invention.

An embodiment of the present application provides a mobility management entity. As shown in FIG. 24, the mobility management entity includes:

a receiving unit 2401, configured to receive a request message, where the request message includes transmission mode indication information, and the transmission mode indication information is used to instruct a terminal to transmit service data by using a NAS signaling message;

a determining unit 2402, configured to determine second service authorization information of the terminal based on subscription information of the terminal when determining, based on the request message, that the terminal transmits the service data by using the NAS signaling message, where the second service authorization information includes information used to indicate a service type and/or a priority that is allowed to be used by the terminal to transmit the service data; and a sending unit 2403, configured to send the second service authorization information determined by the determining unit 2402 to the terminal.

In a possible design, the second service authorization information further includes first quota information, and the first quota information is used to indicate a volume of service data that is of the service type and that is allowed to be sent within a particular time.

In a possible design, the second service authorization information further includes second quota information, and the second quota information is used to indicate a volume of service data that is of the priority and that is allowed to be sent within a particular time.

In this embodiment of the present invention, the unit division is an example, is merely logical function division, and may be other division in an actual implementation. In addition, functional units in each embodiment of the present application may be integrated into one processor or may exist alone physically. Alternatively, two or more units may be integrated into one unit. The foregoing integrated unit may be implemented in a form of hardware, or may be implemented in a form of a software functional module.

Figure 25:
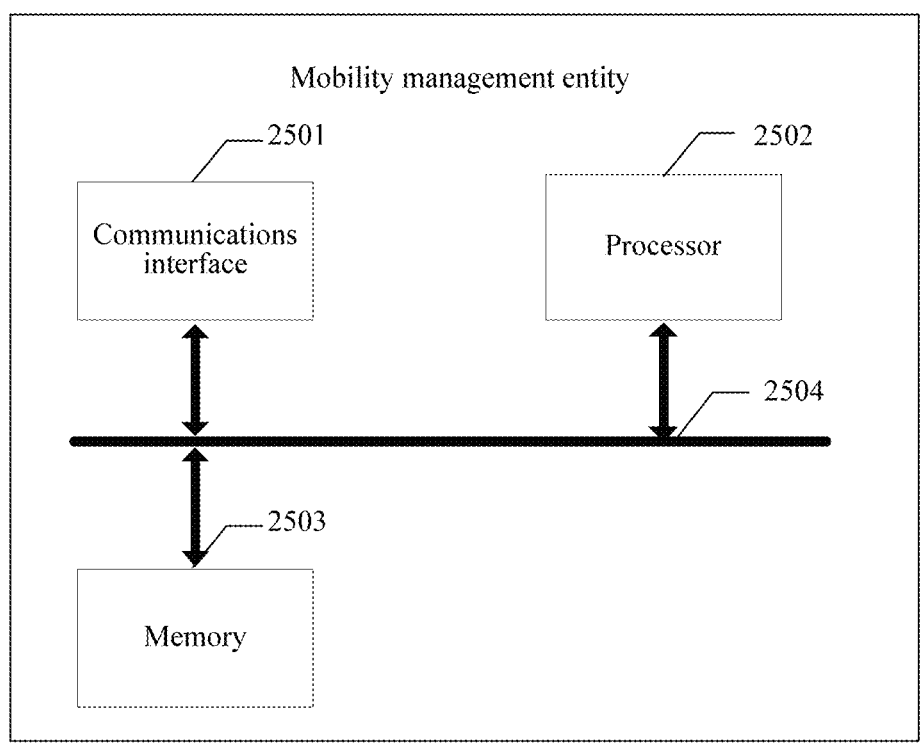
FIG. 25 is a schematic diagram of yet another mobility management entity according to an embodiment of the present invention.

When the integrated unit is implemented in the form of hardware, as shown in FIG. 25, the mobility management entity may include a communications interface 2501, a processor 2502, and a memory 2503. The memory 2503 is configured to store program code executed by the processor 2502. Physical hardware corresponding to the receiving unit 2401 may be the communications interface 2501, and physical hardware corresponding to the determining unit 2402 may be the processor 2502. Physical hardware corresponding to the sending unit 2403 may be the communications interface 2501.

The processor 2502 may be a CPU, a digital processing unit, or the like. The processor 2502 receives a message by using the communications interface 2501 and sends a message by using the communications interface 2501.

A specific connection medium between the communications interface 2501, the processor 2502, and the memory 2503 are not limited in this embodiment of the present invention. In this embodiment of the present invention, the communications interface 2501, the processor 2502, and the memory 2503 are connected by using a bus 2504 in FIG. 25. The bus is represented by using a thick line in FIG. 25, and a connection manner between other components is merely described as an example, and is not limited thereto. The bus may be classified into an address bus, a data bus, a control bus, and the like. For ease of representation, only one thick line is used to represent the bus in FIG. 25, but this does not mean that there is only one bus or only one type of bus.

The memory 2503 may be a volatile memory, such as a RAM. Alternatively, the memory 2503 may be a non-volatile memory, such as a ROM, a flash memory, an HDD, or an SSD. Alternatively, the memory 2503 is any other medium that can be used to carry or store expected program code that has an instruction or data structure form and that can be accessed by a computer, but is not limited thereto. The memory 2503 may be a combination of the foregoing memories.

The communications interface 2501 is configured to receive a request message, where the request message includes transmission mode indication information, and the transmission mode indication information is used to instruct a terminal to transmit service data by using a NAS signaling message.

The processor 2502 is configured to determine second service authorization information of the terminal based on subscription information of the terminal when determining, based on the request message, that the terminal transmits the service data by using the NAS signaling message, where the second service authorization information includes information used to indicate a service type and/or a priority that is allowed to be used by the terminal to transmit the service data.

The communications interface 2501 is further configured to send the second service authorization information to the terminal.

In a possible design, the second service authorization information further includes first quota information, and the first quota information is used to indicate a volume of service data that is of the service type and that is allowed to be sent within a particular time.

In a possible design, the second service authorization information further includes second quota information, and the second quota information is used to indicate a volume of service data that is of the priority and that is allowed to be sent within a particular time.

It should be noted that the mobility management entity in the embodiment shown in FIG. 24 or FIG. 25 may be configured to perform operation steps of the mobility management entity or the MME in the method in Embodiment 2 or each implementation scenario of Embodiment 2, and details are not described herein again.

Figure 26:
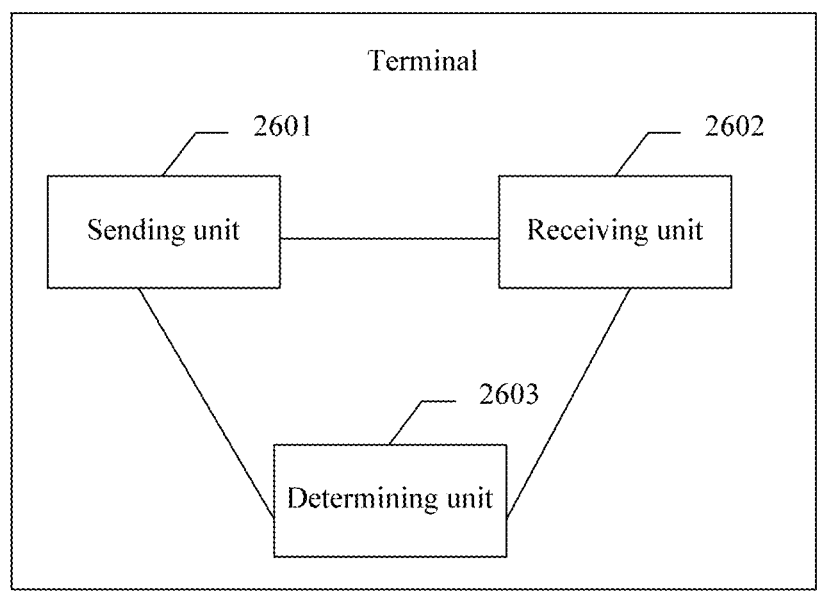
FIG. 26 is a schematic diagram of a terminal according to an embodiment of the present invention.

An embodiment of the present application provides a terminal. As shown in FIG. 26, the terminal includes:

a sending unit 2601, configured to send a request message to a mobility management entity, where the request message includes transmission mode indication information, and the transmission mode indication information is used to instruct the terminal to transmit service data by using a NAS signaling message;

a receiving unit 2602, configured to receive second service authorization information sent by the mobility management entity, where the second service authorization information includes information used to indicate a service type and/or a priority that is allowed to be used by the terminal to transmit the service data; and a determining unit 2603, configured to determine information about the service data based on the second service authorization information received by the receiving unit 2602, where the information about the service data includes at least one of the service type of the service data and the priority of the service data.

The sending unit 2601 is further configured to send the information that is about the service data and that is determined by the determining unit 2603 to the access network device.

In a possible design, the second service authorization information further includes first quota information, and the first quota information is used to indicate a volume of service data that is of the service type and that is allowed to be sent within a particular time.

In a possible design, the second service authorization information further includes second quota information, and the second quota information is used to indicate a volume of service data that is of the priority and that is allowed to be sent within a particular time.

In this embodiment of the present invention, the unit division is an example, is merely logical function division, and may be other division in an actual implementation. In addition, functional units in each embodiment of the present application may be integrated into one processor or may exist alone physically. Alternatively, two or more units may be integrated into one unit. The foregoing integrated unit may be implemented in a form of hardware, or may be implemented in a form of a software functional module.

Figure 27:
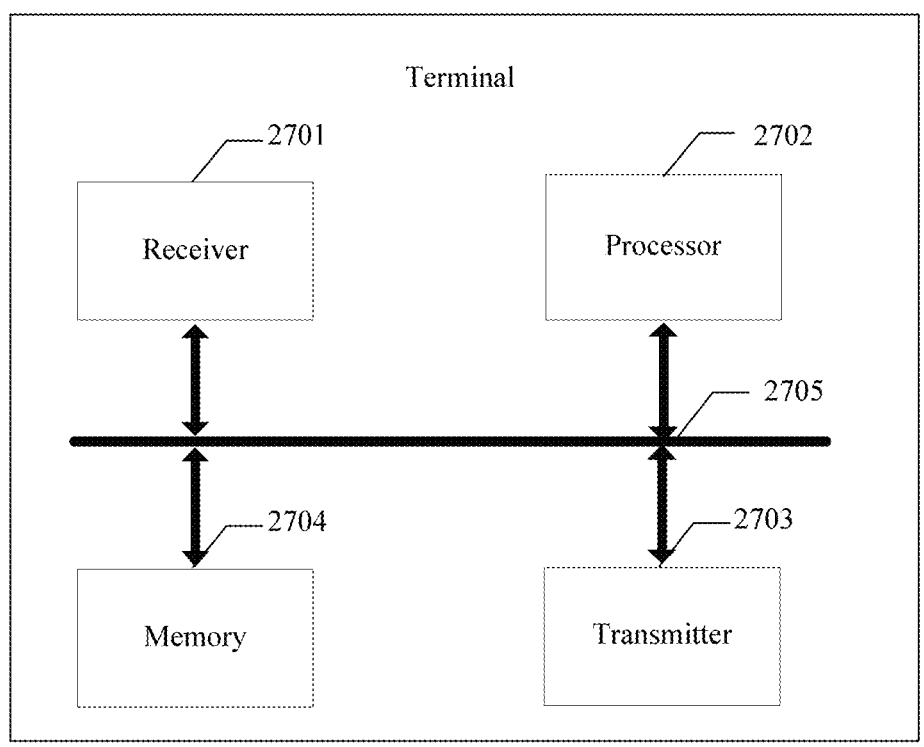
FIG. 27 is a schematic diagram of another terminal according to an embodiment of the present invention.

When the integrated unit is implemented in the form of hardware, as shown in FIG. 27, the terminal may include a receiver 2701, a processor 2702, and a transmitter 2703, and further includes a memory 2704. The memory 2704 is configured to store program code executed by the processor 2702. Physical hardware corresponding to the receiving unit 2602 may be the receiver 2701, and physical hardware corresponding to the determining unit 2603 may be the processor 2702. Physical hardware corresponding to the sending unit 2601 may be the transmitter 2703.

The processor 2702 may be a CPU, a digital processing unit, or the like. The processor 2702 receives a message by using the receiver 2701 and sends a message by using the transmitter 2703.

A specific connection medium between the receiver 2701, the processor 2702, the transmitter 2703, and the memory 2704 are not limited in this embodiment of the present invention. In this embodiment of the present invention, the receiver 2701, the processor 2702, the transmitter 2703, and the memory 2704 are connected by using a bus 2705 in FIG. 27. The bus is represented by using a thick line in FIG. 27, and a connection manner between other components is merely described as an example, and is not limited thereto. The bus may be classified into an address bus, a data bus, a control bus, and the like. For ease of representation, only one thick line is used to represent the bus in FIG. 27, but this does not mean that there is only one bus or only one type of bus.

The memory 2704 may be a volatile memory, such as a RAM. Alternatively, the memory 2704 may be a non-volatile memory, such as a ROM, a flash memory, an HDD, or an SSD. Alternatively, the memory 2704 is any other medium that can be used to carry or store expected program code that has an instruction or data structure form and that can be accessed by a computer, but is not limited thereto. The memory 2704 may be a combination of the foregoing memories.

The transmitter 2703 is configured to send a request message to a mobility management entity, where the request message includes transmission mode indication information, and the transmission mode indication information is used to instruct the terminal to transmit service data by using a NAS signaling message.

The receiver 2701 is configured to receive second service authorization information sent by the mobility management entity, where the second service authorization information includes information used to indicate a service type and/or a priority that is allowed to be used by the terminal to transmit the service data.

The processor 2702 is configured to determine information about the service data based on the second service authorization information, where the information about the service data includes at least one of the service type of the service data and the priority of the service data.

The transmitter 2703 is further configured to send the information about the service data to the access network device.

In a possible design, the second service authorization information further includes first quota information, and the first quota information is used to indicate a volume of service data that is of the service type and that is allowed to be sent within a particular time.

In a possible design, the second service authorization information further includes second quota information, and the second quota information is used to indicate a volume of service data that is of the priority and that is allowed to be sent within a particular time.

It should be noted that the terminal in the embodiment shown in FIG. 26 or FIG. 27 may be configured to perform operation steps of the terminal or the UE in the method in Embodiment 2 or each implementation scenario of Embodiment 2, and details are not described herein again.

Persons skilled in the art should understand that embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to constitute a machine, so that the instructions executed by a computer or a processor of any other programmable data processing device constitute a device for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory provide an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present application have been described, persons skilled in the art can make changes and modifications to these embodiments.

Persons skilled in the art can make various modifications and variations to the present application without departing from the spirit and scope of the present invention. The present application is intended to cover these modifications and variations provided that they fall within the scope of protection defined by the following claims and their equivalent technologies.

Additionally, statements made herein characterizing the invention refer to an embodiment of the invention and not necessarily all embodiments.

What is claimed is:

1. A service data transmission method, comprising:
    sending, by a terminal, a request message to a mobility management entity;
    receiving, by the terminal, service authorization information from the mobility management entity, wherein the service authorization information indicates at least one of a service type or a priority that the terminal is allowed to use for transmission of service data, wherein the service authorization information further indicates that the terminal is allowed to use an exception report service type, and wherein the service authorization information further comprises quota information that indicates a volume of service data that the terminal is allowed to send using the exception report service type within a particular time;
    setting, by the terminal, based on the service authorization information, a priority for first service data of an application layer from among a plurality of priorities, wherein the plurality of priorities comprises a first priority and a second priority that is higher than the first priority;
    sending, by the terminal, based on the set priority, the first service data using the exception report service type;
    determining, by the terminal, that the volume of first service data sent using the exception report service type has reached the volume indicated in the quota information; and
    after determining that the volume of first service data sent using the exception report service type has reached the volume indicated in the quota information, sending, by the terminal, the first service data using a periodic report service type.

2. The method according to claim 1, wherein the quota information further indicates a volume of service data corresponding to a respective priority and that is allowed to be sent within a particular time.

3. The method according to claim 1, wherein the set priority is the second priority, and the quota information indicates a volume of service data that the terminal is allowed to send at the second priority within a particular time.

4. The method according to claim 3, further comprising:
sending, by the terminal, the first service data at the second priority;
determining, by the terminal, that the volume of first service data sent at the second priority has reached the volume of service data that the terminal is allowed to send at the second priority within a particular time; and
after determining that the volume of first service data sent at the second priority has reached the volume of service data that the terminal is allowed to send at the second priority within a particular time, sending, by the terminal, the first service data at the first priority.

5. A mobility management entity, comprising:
a communications interface, configured to receive a request message from a terminal; and
a processor, configured to:
  determine, based on the request message, that the terminal transmits service data by using NAS signaling; and
  in response to determining that the terminal transmits service data by using NAS signaling, determine service authorization information of the terminal based on subscription information of the terminal, wherein the service authorization information indicates at least one of a service type or a priority that the terminal is allowed to use for transmission of service data, wherein the service authorization information further indicates that the terminal is allowed to use an exception report service type, and wherein the service authorization information further comprises quota information that indicates a volume of service data that the terminal is allowed to send using the exception report service type within a particular time;
wherein the communications interface is further configured to send the service authorization information to the terminal to facilitate the terminal setting, based on the service authorization information, a priority for first service data of an application layer from among a plurality of priorities, wherein the plurality of priorities comprises a first priority and a second priority that is higher than the first priority; and
wherein the service authorization information prevents a low-priority terminal from overusing exception reporting by causing the terminal to switch to a periodic report service type after a volume of first service data sent using the exception report service type has reached the volume indicated in the quota information.

6. The mobility management entity according to claim 5, wherein the quota information indicates a volume of service data corresponding to a respective priority and that is allowed to be sent within a particular time.

7. The mobility management entity according to claim 5, wherein the service authorization information prevents a low-priority terminal from sending service data at a high priority.

8. The mobility management entity according to claim 5, wherein the quota information further indicates a volume of service data corresponding to a respective priority and that is allowed to be sent within a particular time, such that the service authorization information prevents a low-priority terminal from overusing high priority reporting based on the quota information.

9. A terminal, comprising:
a transmitter, configured to send a request message to a mobility management entity;
a receiver, configured to receive service authorization information from the mobility management entity, wherein the service authorization information indicates at least one of a service type or a priority that the terminal is allowed to use for transmission of service data, wherein the service authorization information further indicates that the terminal is allowed to use an exception report service type, and wherein the service authorization information further comprises quota information that indicates a volume of service data that the terminal is allowed to send using the exception report service type within a particular time; and
a processor, configured to set, based on the service authorization information, a priority of first service data of an application layer from among a plurality of priorities, wherein the plurality of priorities comprises a first priority and a second priority that is higher than the first priority;
wherein the transmitter is further configured to send, based on the set priority, the first service data using the exception report service type;
wherein the processor is further configured to determine that the volume of first service data sent using the exception report service type has reached the volume indicated in the quota information; and
wherein after the determining that the volume of the first service data sent using the exception report service type has reached the volume indicated in the quota information, the transmitter is further configured to send the first service data using a periodic report service type.

10. The terminal according to claim 9, wherein the quota information indicates a volume of service data corresponding to a respective priority and that is allowed to be sent within a particular time.

11. The terminal according to claim 9, wherein the set priority is the second priority, and the quota information indicates a volume of service data that the terminal is allowed to send at the second priority within a particular time.

12. The terminal according to claim 11, wherein the transmitter is further configured to send the first service data at the second priority;
wherein the processor is further configured to determine that the volume of first service data sent at the second priority has reached the volume of service data that the terminal is allowed to send at the second priority within a particular time; and
wherein the transmitter is further configured to send the first service data at the first priority after the volume of first service data sent at the second priority has reached the volume of service data that the terminal is allowed to send at the second priority within a particular time.

* * * * *